US011914786B2

(12) United States Patent
Nocon

(10) Patent No.: US 11,914,786 B2
(45) Date of Patent: Feb. 27, 2024

(54) GESTURE RECOGNITION (GR) DEVICE WITH MULTIPLE LIGHT SOURCES GENERATING MULTIPLE LIGHTING EFFECTS

(71) Applicant: Warner Bros. Entertainment Inc., Burbank, CA (US)

(72) Inventor: Nathan Nocon, Valencia, CA (US)

(73) Assignee: Warner Bros. Entertainment Inc., Burbank, CA (US)

( * ) Notice: Subject to any disclaimer, the term of this patent is extended or adjusted under 35 U.S.C. 154(b) by 244 days.

(21) Appl. No.: 17/547,483

(22) Filed: Dec. 10, 2021

(65) Prior Publication Data

US 2022/0100282 A1     Mar. 31, 2022

Related U.S. Application Data

(63) Continuation-in-part of application No. PCT/US2020/049372, filed on Sep. 4, 2020.
(Continued)

(51) Int. Cl.
*H05B 47/13* (2020.01)
*G06F 3/01* (2006.01)
(Continued)

(52) U.S. Cl.
CPC .............. *G06F 3/017* (2013.01); *A63F 9/24* (2013.01); *A63H 33/22* (2013.01); *A63H 33/26* (2013.01);
(Continued)

(58) Field of Classification Search
CPC ........ H05B 47/10; H05B 47/13; H05B 47/19; H05B 47/115; H05B 47/125;
(Continued)

(56) References Cited

U.S. PATENT DOCUMENTS 9,497,819 B2 * 11/2016 Van De Sluis ....... G06F 1/1694
10,222,868 B2    3/2019 Martinez Fernandez et al.
(Continued)

FOREIGN PATENT DOCUMENTS

EP          3007030 A1    4/2016
KR   10-2017-0035547 A   3/2017
(Continued)

OTHER PUBLICATIONS

Corrected Notice of Allowance for U.S. Appl. No. 17/547,351 dated Mar. 1, 2023.
(Continued)

*Primary Examiner* — Haissa Philogene
(74) *Attorney, Agent, or Firm* — Alston & Bird LLP

(57) ABSTRACT

Provided is a gesture recognition (GR) device that includes a circuit board on which a plurality of light sources are mounted. A first light source is side-mounted at a tip of a second unit of the circuit board, and the set of second light sources is mounted at right angles at top and bottom surfaces of the second unit. A first pair from the set of second light sources is positioned adjacent to the side-mounted first light source. The plurality of light sources are controlled to generate multiple lighting effects for the tip based on assertion signals generated at a first unit of the circuit board. A first lighting effect corresponds to a directional beam generated by the first light source. A set of second lighting effects, which remains unblocked by the side-mounted first light source, corresponds to a multi-color illumination generated by the set of second light sources.

20 Claims, 13 Drawing Sheets

Related U.S. Application Data

(60) Provisional application No. 62/897,220, filed on Sep. 6, 2019.

(51) Int. Cl.

| | |
|---|---|
| *H05B 45/20* | (2020.01) |
| *H05B 47/195* | (2020.01) |
| *G06V 40/10* | (2022.01) |
| *G06V 40/20* | (2022.01) |
| *A63F 9/24* | (2006.01) |
| *A63H 33/22* | (2006.01) |
| *A63H 33/26* | (2006.01) |
| *G06F 3/03* | (2006.01) |
| *G06F 3/0346* | (2013.01) |

(52) U.S. Cl.
CPC .......... *G06F 3/0304* (2013.01); *G06F 3/0346* (2013.01); *G06V 40/10* (2022.01); *G06V 40/28* (2022.01); *H05B 45/20* (2020.01); *H05B 47/13* (2020.01); *H05B 47/195* (2020.01); *A63F 2009/247* (2013.01); *A63F 2009/2447* (2013.01); *A63F 2009/2454* (2013.01); *A63F 2250/485* (2013.01)

(58) Field of Classification Search
CPC .... H05B 47/175; H05B 47/195; H05B 45/10; H05B 45/20; G06F 1/1694; G06F 1/1686; G06F 3/011; G06F 3/017; G06F 3/0346; G06F 3/0304; G06V 40/10; G06V 40/28; A63F 9/24; A63F 2009/2447; A63F 2009/2454; A63F 2009/247; A63F 2250/485; A63H 33/22; A63H 33/26
See application file for complete search history.

(56) References Cited

U.S. PATENT DOCUMENTS

| | | | |
|---|---|---|---|
| 10,281,987 B1 | 5/2019 | Yang et al. | |
| 11,003,307 B1 | 5/2021 | Ravasz et al. | |
| 11,021,098 B1 * | 6/2021 | Brown | H05B 47/105 |
| 11,086,475 B1 | 8/2021 | Ravasz et al. | |
| 11,422,669 B1 | 8/2022 | Ravasz et al. | |
| 2004/0204240 A1 | 10/2004 | Barney | |
| 2010/0134308 A1 | 6/2010 | Barnardo et al. | |
| 2011/0199292 A1 | 8/2011 | Kilbride | |
| 2013/0328762 A1 | 12/2013 | Mcculloch et al. | |
| 2013/0328763 A1 | 12/2013 | Latta et al. | |
| 2014/0092011 A1 | 4/2014 | De Foras et al. | |
| 2014/0139454 A1 | 5/2014 | Mistry et al. | |
| 2014/0240102 A1 | 8/2014 | Kawash et al. | |
| 2014/0267184 A1 | 9/2014 | Bathiche et al. | |
| 2015/0105159 A1 | 4/2015 | Palotas | |
| 2015/0185713 A1 | 7/2015 | Glickfield et al. | |
| 2015/0346834 A1 | 12/2015 | Fernandez et al. | |
| 2015/0363034 A1 | 12/2015 | Hinckley et al. | |
| 2016/0011668 A1 * | 1/2016 | Gilad-Bachrach | G06F 3/04166 |
| | | | 345/156 |
| 2016/0091980 A1 | 3/2016 | Baranski et al. | |
| 2017/0064169 A1 * | 3/2017 | Mishra | H04N 23/74 |
| 2017/0087453 A1 | 3/2017 | Poisner et al. | |
| 2017/0123515 A1 | 5/2017 | Ha et al. | |
| 2017/0308173 A1 * | 10/2017 | Youn | G01V 8/20 |
| 2018/0085673 A1 | 3/2018 | Birkedal | |
| 2018/0101231 A1 | 4/2018 | Seth | |
| 2019/0014048 A1 | 1/2019 | Singuru | |
| 2019/0325651 A1 | 10/2019 | Bradner et al. | |
| 2019/0369755 A1 | 12/2019 | Roper et al. | |
| 2019/0380801 A1 | 12/2019 | Savall et al. | |
| 2019/0380802 A1 | 12/2019 | Savall et al. | |
| 2020/0042111 A1 | 2/2020 | Connellan et al. | |
| 2020/0081516 A1 * | 3/2020 | Zyskind | G06F 3/04883 |
| 2020/0261815 A1 | 8/2020 | Neal | |
| 2021/0034188 A1 * | 2/2021 | Kwon | G06F 3/017 |
| 2021/0252386 A1 | 8/2021 | VanWyk et al. | |
| 2022/0100280 A1 * | 3/2022 | Nocon | A63F 13/211 |
| 2023/0113991 A1 | 4/2023 | Ang et al. | |

FOREIGN PATENT DOCUMENTS

| | | | |
|---|---|---|---|
| WO | 2011057287 A1 | 5/2011 | |
| WO | 2017/052077 A1 | 3/2017 | |

OTHER PUBLICATIONS

International Preliminary Report on Patentability Under Chapter I, for International Application No. PCT/US2020/049372, dated Mar. 17, 2022, (9 pages), The International Bureau of WIPO, Geneva, Switzerland.

International Search Report and Written Opinion for International Application No. PCT/US2020/049732, dated Dec. 1, 2020, (10 pages), Korean Intellectual Property Office, Daejeon, Republic of Korea.

Examination Report for GB Application No. 2205006.6 dated Nov. 25, 2022.

Notice of Allowance for U.S. Appl. No. 17/547,351 dated Feb. 22, 2023.

Combined Search and Examination Report Under Sections 17 and 18(3) for Great Britain Patent Application No. GB2305231.9, dated Oct. 5, 2023, (5 pages), Intellectual Property Office, South Wales, United Kingdom.

Communication Pursuant to Rule 164(1) EPC, Partial Supplementary European Search Report for Patent Application No. 20861529.4, dated Oct. 6, 2023, (13 pages), European Patent Office, Munich, Germany.

Notice of Allowance and Fee(s) Due for U.S. Appl. No. 17/547,395, dated Oct. 17, 2023, (9 pages), United States Patent and Trademark Office, US.

* cited by examiner

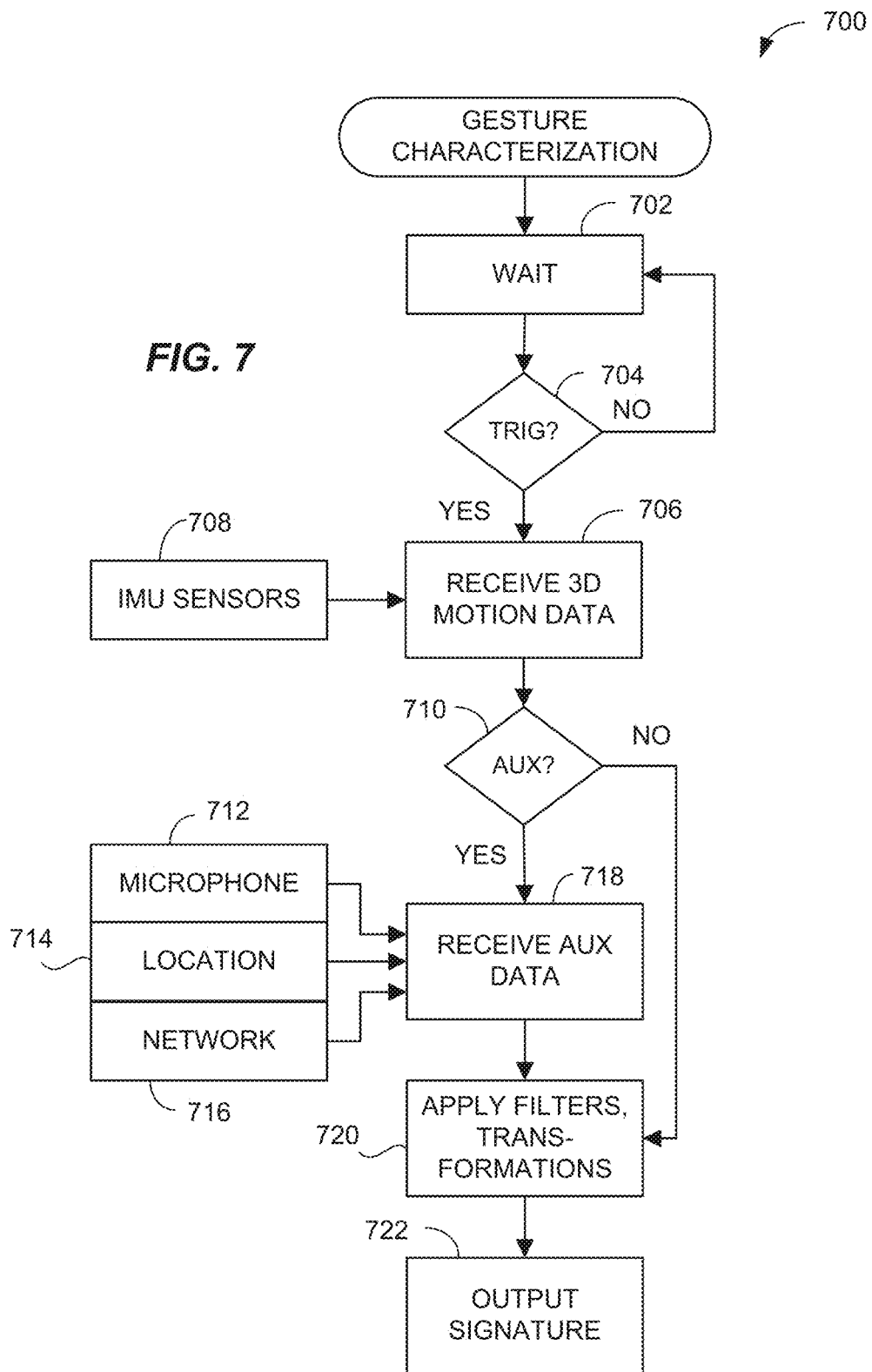

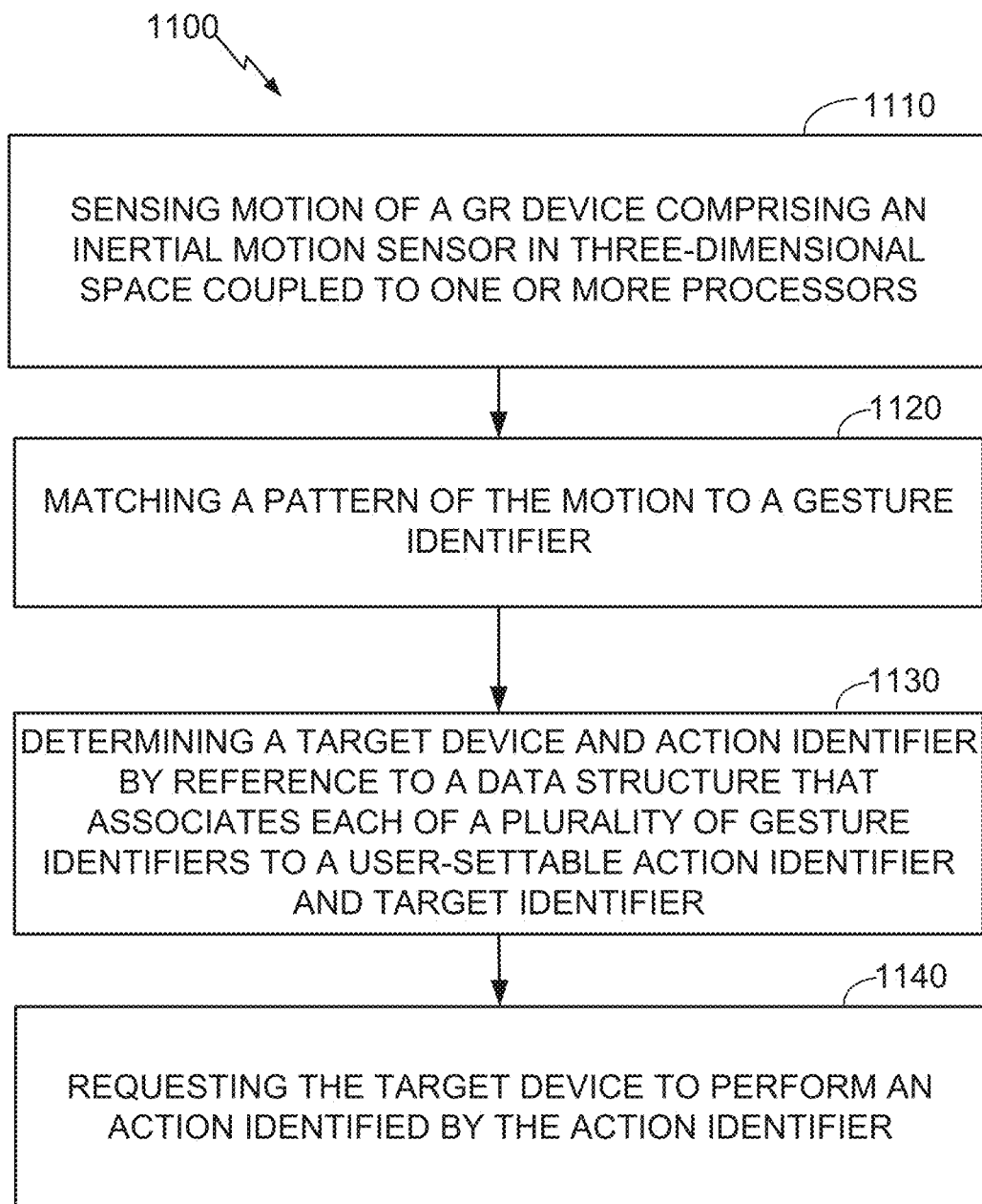

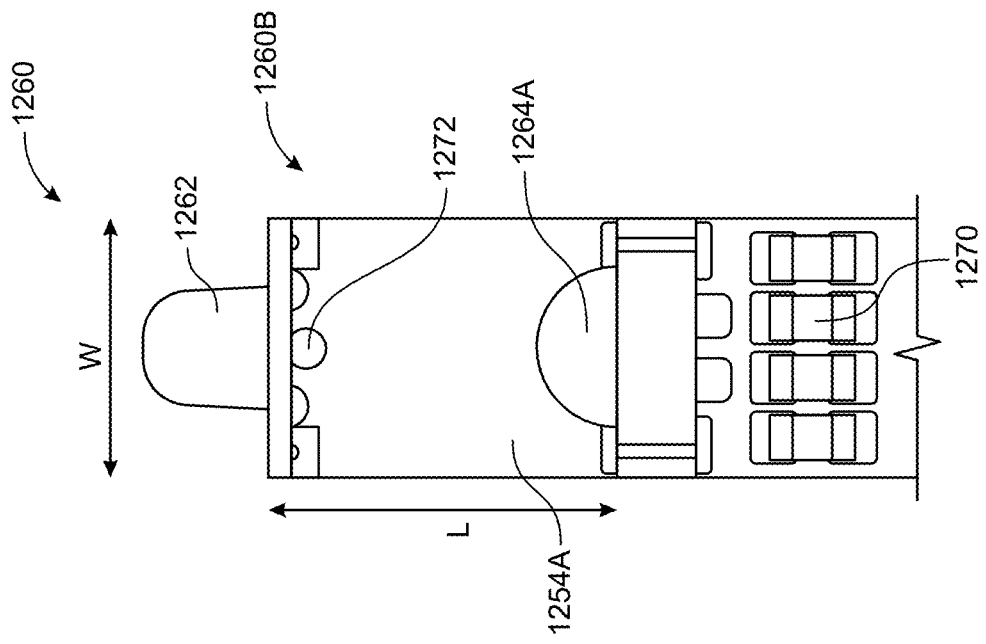
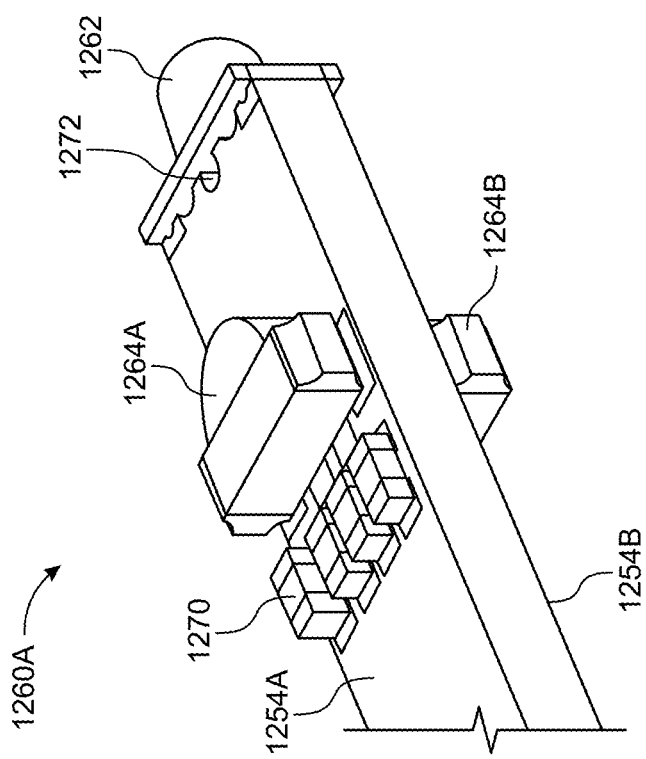
FIG. 12C

GESTURE RECOGNITION (GR) DEVICE WITH MULTIPLE LIGHT SOURCES GENERATING MULTIPLE LIGHTING EFFECTS

CROSS-REFERENCE TO RELATED APPLICATION

This patent application claims priority to, and the benefit from, and is a continuation-in-part of International Application No. PCT/US20/49372, filed on Sep. 4, 2020, and which claims priority to U.S. Provisional Application No. 62/897,220, filed on Sep. 6, 2019.

Each of the above referenced patent applications is hereby incorporated herein by reference in its entirety.

FIELD

The present application relates to machine-human interfaces, and more particularly to apparatus, systems and methods for enabling gesture-centric control input for computer processes, and related applications. Further, certain embodiments of the disclosure relate to gesture recognition (GR) device with multiple light sources generating multiple lighting effects.

BACKGROUND

Various user interface devices have been developed for interacting with machines, especially computers, by detecting movement of a body part or hand-held device.

A first type uses sensors to detect body movement using a wireless sensor, for example an infrared sensor.

A second type relies on sensing movement of a sensor that is attached to or grasped by the user. For example, pointing devices, e.g., an electronic mouse, can detect movement in two dimensions, depending on the model. Smartphones and similar devices include position and orientation sensors that can sense movement of the device for input to any application the device can run. Handheld controllers for virtual reality translate hand movement into virtual hand movement in a virtual space.

Toy electronic wands that emit light or tactile vibration when grasped or waved about are also available. These toys lack the ability to control external devices. The user receives the mere pleasure of observing light or tactile emission from the wand. In certain cases, for such toy electronic wands, the aesthetic look-and-feel can be compromised due to different light sources, such as infrared (IR) light emitting diode (LED) and RGB LEDs, edge-mounted on the top and/or bottom surfaces of a circuit board. However, both the IR LED and RGB LEDs edge-mounted together on the same surface may result in blocking of the RGB illumination by the IR LED, which may adversely affect the lighting effect of the RGB LEDs. In other cases, a flex cable may be used to couple the different light sources, which may be arranged in-line with respect to each other, to the circuit board. However, due to such coupling, the flex cables tend to surround the light sources, i.e., the IR LED and RGB LEDs, on the circuit board. Further, due to the flex cables, the overall cost of the toy electronic wand may increase. Furthermore, a substantial space may be required as the flex cables surround the different light sources for coupling to the circuit board.

It is desirable to develop new methods, apparatus and systems for gesture-centric user interfaces, that enable users to control a variety of electronic devices or perform a variety of actions in the real world with gestures.

SUMMARY

This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect, a gesture-recognition (GR) device made to be held or worn by a user includes an electronic processor configured by program instructions in memory to recognize a gesture. As used herein, a "gesture" is a pattern of movements, such as, for example, up-and-down, side-to-side, inward-outward and/or any combination thereof. The movements may be of a sensor integrated with an associated prop. In an aspect, a movement sensor is attached to (e.g., incorporated into the electronics of) the GR device. In another aspect, the GR device is capable of sensing 3-dimensional motion with up to six degrees of freedom (three linear axes, and three rotational axes), plus three axes of geospatial orientation if desired, using the movement sensor (e.g., an inertial measurement unit (IMU)).

To recognize a gesture, the processor of the gesture-recognition (GR) device detects a pattern of movements, classifies the pattern to a type or rejects it as unclassifiable, and associates the type (if any) to an electronic instruction. It may perform any or all these operations locally or remotely, using a heuristic algorithm, a rules-based algorithm, or a combination of heuristic and rules-based algorithm. In an aspect, the processor may access a library comprising a plurality of action identifiers associated with a plurality of gesture types to identify an action associated with the recognized gesture type from a library. As used herein, an "action" includes user-directed changes in machine states, for example, illuminating a light, extinguishing a light, retrieving content, playing content, jumping ahead or backwards in content, opening a door, or any of the innumerable things that a machine controlled by an electronic processor can do. In the context of a data library, an "action identifier" is data that enables the action to be identified, for example, a pointer, an instruction set or module, or other identification code. In a related aspect, the processor, or a processor of an associated interface device, may include instructions that enable a user to edit the associations between action identifiers and gesture types.

In another aspect, the processor of the GR device, or another in communication with it, may send a signal to one or more targeted ancillary devices, causing each ancillary device to execute instructions performing the identified action. For example, the processor may execute instructions to perform the identified action that include electronically transmitting signals to a second electronic processor located in a second device. The second device may be, or may include, at least one of a light, a television, a projector, a refrigerator, a personal smart device, an appliance, a virtual reality device, an augmented reality device, a display device, or a toy.

In related aspects, the gesture recognition device may include a light emitting device (LED), wherein the action may include altering a characteristic of light emitted from the LED device, such as, for example, its color, flashing rate, or intensity. The gesture recognition device may include an inertial measurement unit (IMU) configured to detect gestures in three-dimensional space, including gestures having six degrees of freedom (3 linear, 3 rotational) or less, plus three axes of geospatial orientation if desired. The electronic processor is configured to recognize the gesture based on signals received from the inertial measurement unit.

In some embodiments, classifying gestures by type and associating the action identifiers and gesture types may be done remotely, e.g., by a remote server or a mobile device, while characterizing a movement pattern as digital data is done by a processor of device that undergoes the movement. Thus, the GR device may initiate the first critical process in gesture recognition—converting a gesture into a wireless, machine-readable signal that can be characterized by type—without performing later operations in a chain of causation between a gesture by the user and an action by a target device. In other embodiments, the GR device may perform later operations in the chain of causation, up to but not including performing the action itself. The GR device may also perform local actions, for example, emitting sounds, vibrations, or lights, synchronized to the action performed by the targeted device. In an aspect, the GR device may perform local actions indicating other outcomes, such as a failure to classify a gesture of a recognizable type, or a failure to communicate an action identifier to a targeted device. In addition, the GR device may perform local actions indicating intermediate states, for example successful input of a gesture to type.

In other aspects, a system for providing a personalized experience may include a central electronic processor at a central location, an edge electronic processor near a first location, and a plurality of connected devices at the first location, wherein the central processor is configured to send instructions to control the plurality of connected devices at the first location to create a personalized experience for a user at the first location. The plurality of connected devices may include at least one of a user arrival notification system, a light, a mirror, a television, a projector, a virtual reality device, an augmented reality device, a speaker or a microphone.

The system may further include, in a computer memory, encoded information about capabilities of the plurality of connected devices at the first location. The information about capabilities of the plurality of connected devices at the first location may be in a database accessible by the central processor. In such embodiments, the central processor is configured to send instructions to control the plurality of connected devices at the first location to create a personalized experience for a user at the first location based on the capabilities of the plurality of connected devices at the first location. As used herein, a "personalized experience" means sensory output from the connected devices that is configured based on information defined by or for an individual user indicative of the user's preferences for the sensory output.

In an alternative, or in addition, the information about capabilities of the plurality of connected devices at the first location may be in a database accessible by the edge processor. In such embodiments, the central processor may be configured to send instructions to control the plurality of connected devices at the first location assuming full capabilities of the plurality of connected devices and the edge processor may be configured to receive the instructions and provide a personalized experience for a user at the first location based on the instructions and on capabilities of the plurality of connected devices at the first location to command a personalized experience for a user at the first location.

In an aspect, a GR device may be, or may be locally connected to, an edge processor of the system. The personalized experience may include controlling the plurality of connected devices at the first location according to a gesture-recognition library defined by of for a user of the GR device. In an aspect, an edge processor or the central processor may translate between In accordance with an aspect of the disclosure, a GR device may comprise a memory for storing instructions and a processor for executing the instructions to perform a method. The method may comprise controlling a plurality of light sources to generate multiple lighting effects for at least the tip of a second unit of a circuit board based on assertion signals generated at a first unit of the circuit board. The circuit board, on which the plurality of light sources are mounted, may include a first light source and a set of second light sources. The first light source may be side-mounted at the tip of the second unit. The set of second light sources may be mounted at right angles at top and bottom surfaces of the second unit. A first pair from the set of second light sources may be positioned adjacent to the side-mounted first light source. In accordance with an embodiment, the generated multiple lighting effects may comprise the first lighting effect and the set of second lighting effects. The first lighting effect may correspond to a directional beam generated by the first light source. The set of second lighting effects may correspond to a multi-color illumination generated by the set of second light sources. The set of second lighting effects remains unblocked by the side-mounted first light source.

In accordance with an embodiment, the first unit may correspond to a base unit configured to be grasped by hand of a user, and the second unit corresponds to an elongate unit that extends outward from the first unit.

In accordance with an embodiment, the first light source may correspond to an infrared (IR) light emitting diode (LED). The set of second light sources may correspond to RGB LEDs. The directional beam of the first light source may be in IR spectrum. The illumination of the set of second light sources in the multiple colors may be in the visible spectrum, In accordance with an embodiment, the plurality of light sources may be controlled to generate the multiple lighting effects during same time duration.

In accordance with an embodiment, the plurality of light sources may be controlled to generate the multiple lighting effects during different time durations.

In accordance with an embodiment, the illumination by the set of second light sources in the multiple colors may be independent of the directional beam generated by the first light source side-mounted at the tip of the second unit.

In accordance with an embodiment, the circuit board may be a rigid printed circuit board (PCB) with an aspect ratio that corresponds to at least a difference of 70 percent between length and width of the circuit board.

In accordance with an embodiment, a thickness of the first light source may be substantially same as thickness of the circuit board.

In accordance with an embodiment, the first light source may be side-mounted at the tip of the second unit by edge-soldering using edge plating and/or castellations of the circuit board.

In accordance with an embodiment, width of the first light source may remain within top and bottom surfaces of the second unit when the first light source is side-mounted at the tip of the second unit.

In accordance with an embodiment, a portion of an outer shell of the GR device exhibits translucency and bloom radiance upon the illumination of a corresponding pair from the set of second light sources mounted on the second unit. The corresponding pair from the set of second light sources may be located on the second unit positioned underneath the portion of the outer shell of the GR device.

In accordance with an embodiment, the portion of the outer shell of the GR device corresponds to at least an outer shell tip.

In accordance with an embodiment, the portion of the outer shell may be visually opaque before the illumination of the corresponding pair from the set of second light sources.

In accordance with an embodiment, the bloom radiance may be exhibited by the portion of the outer shell is based on a plurality of attributes of the portion of the outer shell. The plurality of attributes may comprise at least a diffusing property of polymer blend of the portion of the outer shell, a transmissive property of the portion of the outer shell, a plurality of properties of coating applied on surface of the portion of the outer shell, a coating technique applied on the surface of the portion of the outer shell, and incorporation of a first pair of LEDs from the set of second light sources mounted at right angles at the top and bottom surface of the tip of the second unit.

In accordance with an embodiment, a directionality feature of the GR device may be identified by a target device based on detection of the directional beam generated by the first light source. A wide angle IR illumination may be generated by the target device.

In accordance with an embodiment, an outer shell tip of the GR device may be coated with an infrared reflective paint that reflects the wide angle IR illumination back to the target device with minimum scattering.

In accordance with an embodiment, the outer shell tip may further comprise a reflective device, such as an optical mirror that reflects the wide angle IR illumination back to the target device with minimum scattering.

In accordance with an embodiment, the method may further comprising actively driving the first light source and the set of second light sources to generate the first lighting effect and the set of second lighting effects, respectively.

In accordance with another aspect of the disclosure, a circuit board is disclosed, that may include a first unit that corresponds to a base unit configured to be grasped by hand of a user, and a second unit that corresponds to an elongate unit that extends outward from the first unit. The circuit board may include a first light source side-mounted at a tip of the second unit, the first light source may be configured to generate a first lighting effect that corresponds to a directional beam. The circuit board may include a set of second light sources mounted at right angles at top and bottom surfaces of the second unit. The set of second light sources may be configured to generate a set of second lighting effects that corresponds to a multi-color illumination. A first pair from the set of second light sources may be positioned adjacent to the side-mounted first light source. The set of second lighting effects remains unblocked by the side-mounted first light source. A controller is configured to drive the first light source and the set of second light sources to generate multiple lighting effects for at least the tip of the second unit of the circuit board based on assertion signals provided at the first unit of the circuit board.

As used herein, a "client device" or "device" includes at least a computer processor coupled to a memory and to one or more ports, including at least one input port and at least one output port (e.g., a desktop computer, laptop computer, tablet computer, smartphone, PDA, etc.), including accessories such as wands, rings, and staffs so equipped. A computer processor may include, for example, a microprocessor, microcontroller, system on a chip, or other processing circuit. As used herein, a "processor" means a computer processor.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the examples may be employed. Other advantages and novel features will become apparent from the following detailed description when considered in conjunction with the drawings and the disclosed examples, which encompass all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify like elements correspondingly throughout the specification and drawings.

FIG. 7 is a flow chart illustrating aspects of characterizing a data signature for use in or with a GR device.

FIG. 11 is a flow chart illustrating a method for controlling a GR device to provide a gesture-centric user interface for controlling one or more connected devices.

FIG. 12C is a diagram that illustrates a tip portion of the PCB, in accordance with various embodiments of the disclosure.

DETAILED DESCRIPTION

Various aspects are now described with reference to the drawings. In the following description, for purposes of explanation, numerous specific details are set forth to provide a thorough understanding of one or more aspects. It may be evident, however, that the various aspects may be practiced without these specific details. In other instances, well-known structures and devices are represented in block diagrams relating what is known to novel aspects of the present disclosure.

Figure 1:
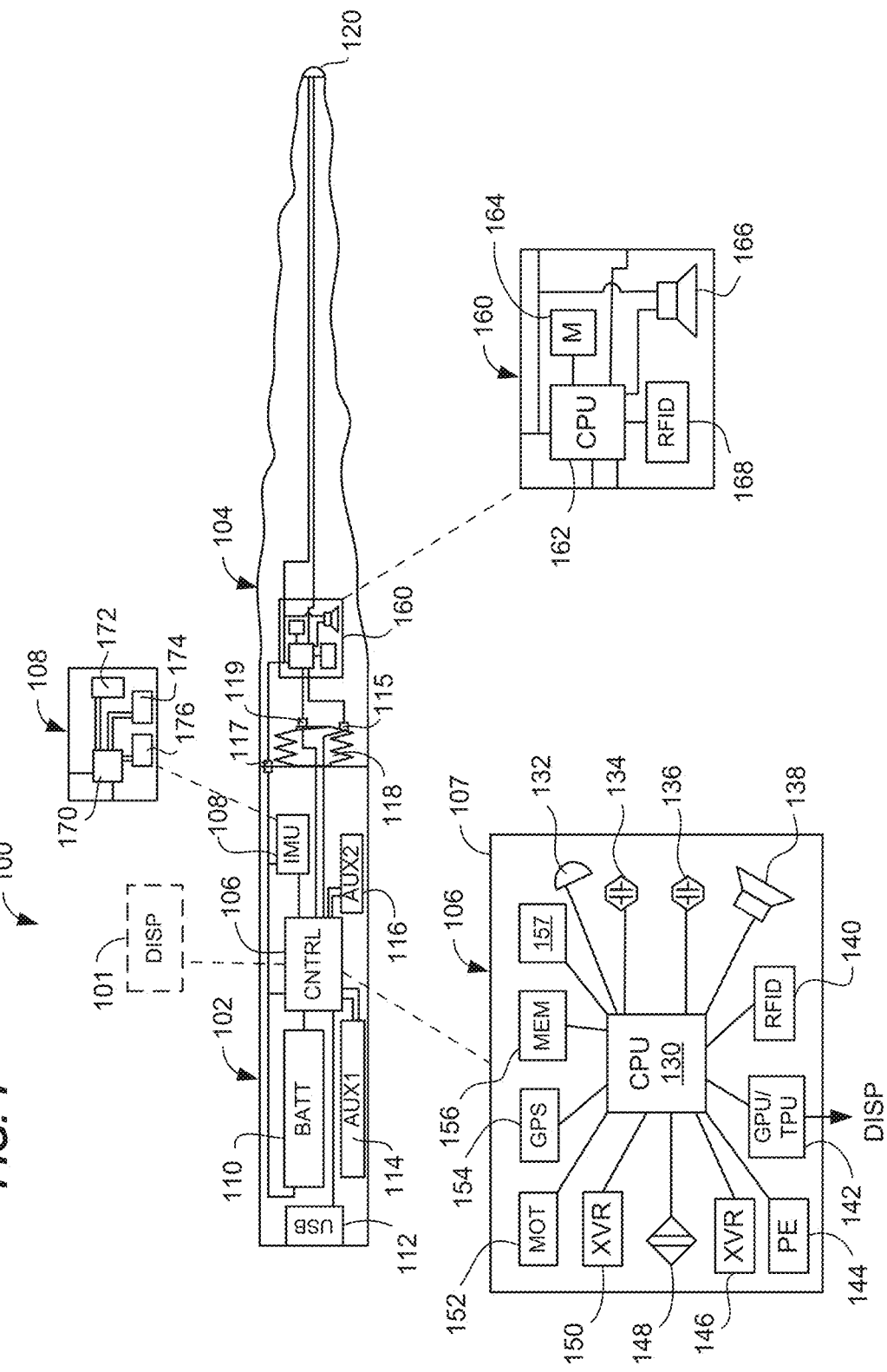
FIG. 1 is a diagram illustrating a GR device and components thereof.

Referring to FIG. 1, gesture-recognition (GR) device 100 may be used with one or more connected devices to provide enhanced experience at home, retail locations, theme parks, theaters and other locations. The GR device may include a controller 106 (e.g., a Raspberry Pi 0W) configured to perform operations of the GR device 100, including detecting different gestures formed by motion of the GR device and triggering correlated actions to be performed by connected devices, for example, devices 201-213 shown in FIG. 2, in response to each gesture. In accordance with various embodiments, the controller 106 may be interchangeably referred to as a microcontroller (MCU), without any deviation from the scope of the disclosure. The connected devices 201-213 to be individually described later may each perform an action determined based on a gesture performed by user 99 holding or wearing the GR device 100, to provide an enhanced personalized experience. The user moves the GR device through a pattern of motion, and with or without a verbal command, one of the connected devices performs a desired action. A good deal of hardware and software makes this appearance of magic possible.

Referring again to FIG. 1, an embodiment of the GR device 100 may include two principal components, a base unit 102 and an elongate unit 104. In some embodiments, the base unit 102 and the elongate unit 104 may be configured as a single piece. For a GR device 100 styled as a wand, the base unit 102 may be configured to be grasped by the user's hand, while the elongate unit 104 may be configured to have a form factor of a wand tip that extends outward from the base unit 102 and provides the wand's overall appearance. In some embodiments, the extendable unit 104 may be configured to be removably attached to the base unit 102. In some embodiments, the base unit 102 may be permanently fixed to the elongate unit 104. In some implementations, all the electronics may be placed in the base unit 102 while the elongate unit 104 can be devoid of any electronics. In some other implementations, a first portion of the electronics may be disposed in the base unit 102 and a second portion of the electronics may be disposed in the elongate unit 104. For example, heavier, more expensive electronic components may be placed in the base unit 102 while relatively inexpensive electronic components may be placed in the elongate unit 104. The elongate unit 104 may be provided with different appearances and capabilities to suit users' needs.

To provide interchangeability, a removable fastener 118 with electrical contacts 115, 117, 119 may be used to couple the base and elongate units 102, 104. While an internally-threaded coupling is shown, other couplings may also be suitable, for example, an externally threaded plug-and-socket, a threadless plug-and-socket with or without a locking feature, and so forth. Since the GR device is designed to be moved rapidly around, a locking feature is advantageous to prevent undesired decoupling.

Capabilities of the GR device 100 may be limited or enhanced depending on an identity of a user of the GR device 100 or the elongate unit 104. For example, the elongate unit 104 may include a radio-frequency identification device (RFID) 168 or other identification device, and a gesture recognition and control system of the GR device 100 may be configured to work differently depending on the identity of the elongate unit. For example, special commands may be "unlocked" for certain identifiers. In home settings, commands may be refused except from movements of GR devices that include identifiers registered for a household. As another example, special commands may be unlocked depending on the identity of a user. Information regarding the identity of a user may be communicated to the GR device 100 via one or more connected devices associated with the GR device 100.

While a wand is illustrated, it should be appreciated that a GR device 100 may have any suitable form factor for being held or worn by a user and carried by movements of a user's extremities. For example, a GR device 100 may be styled as a walking staff, a light stick, a ring, a body ornament, a glove, a bracelet, or any article capable of being held and moved through the air by a user. For further example, in a ring, bracelet, or similar jewelry, the base unit 102 may be contained in the body of the jewelry while the elongate unity 104 may be styled as a gem or ornament.

Ornamental features aside, operation of the GR device 100 depends on its internal circuitry and elements in its wireless network. The internal circuitry of the GR device 100 may include a controller 106 coupled to an inertial measurement unit (IMU) 108, to a power storage unit 110 (e.g., a battery), and to an input-output and power connector 112 (e.g., a Universal Serial Bus (USB) port). Optionally, the controller may be coupled to one or more auxiliary devices 114, 116, described in more detail herein below, and to electronics in the elongate unit 104, for example, one or more light-emitting devices (LEDs) 120 and accompanying controller 160, if any.

The IMU 108 (e.g., sensor BNO055 from Bosch) may include one or more accelerometers 172 for acceleration detection, one or more gyroscopes 174 for force and movement detection, and a magnetometer for geographic orientation. The GR device mat include one or more IMUs 108, which may be in the base unit 102, the elongate unit 104, or in both the primary and elongate units. The IMU may include a processor 170 that determines from sensor data magnitude and direction of motion in up to three spatial axes, three rotational axes, and three geospatial orientation axes, or other useful metric for determining pattern of movement and the associated gestures, using any desired coordinate system (e.g., Cartesian or spherical) and any useful sampling interval, such as for example, 0.1 to 100 milliseconds. The IMU 108 may output other useful information, for example, its geospatial orientation. When the wand 100 is moved in space to perform a gesture, data from the accelerometer, the gyroscope and/or the magnetometer of the IMU 108 is processed by the processor 130 to detect the pattern of movements, identify the gesture and associate it with an action to be performed by a connected device. As described in more details herein, the processor 130 may access local or remote data structures and servers to complete identification of the gesture and selection of an appropriate associated action. The processor 130 may execute the identified action (e.g., illuminating LED 120 with a specific color or emitting a predetermined sound from an audio transducer 138, 166), cause instructions to be sent to a connected device, or both.

The controller 106 may include a processor 130 coupled to a random access memory (RAM) 156 holding program instructions and data for rapid execution or processing by the processor during operation. When the apparatus 100 is powered off or in an inactive state, program instructions and data may be stored in a long-term memory, for example, a non-volatile magnetic, optical, or electronic memory storage device 157. Either or both of the RAM 156 or the storage device 157 may comprise a non-transitory computer-readable medium holding program instructions, that when executed by the processor 130 cause the GR device 100 to perform operations as described herein for gesture recognition and control, alone, or in combination with one or more additional processors. The one or more additional processors may be coupled locally to the processor 130, remotely via a wireless connection, or both. Program instructions may be written in any suitable high-level language, for example, C, C++, C#, JavaScript or Java™, and compiled to produce machine-language code for execution by the processor. Program instructions may be grouped into functional modules, to facilitate coding efficiency and comprehensibility. It should be appreciated that such modules, even if discernable as divisions or grouping in source code, are not necessarily distinguishable as separate code blocks in machine-level coding. Code bundles directed toward a specific function may be considered to comprise a module, regardless of whether or not machine code on the bundle can be executed independently of other machine code. In other words, the modules may be high-level modules only.

To assist with personalization and operation of the GR device 100, the controller 106 may be attached to various other input and output devices, arranged with it on a module circuit board 107 and/or elsewhere in the GR device 100, for example arranged onto a single circuit board within the GR device 100. For example, the controller 106 may be attached to a microphone 132 to receive voice commands, and an audio transducer (e.g., a speaker or piezoelectric device) for audio output. The controller 106 may include a graphics or text processing unit 142 providing a signal for controlling output of an electronic text or graphic display 101. The display 101 may be integrated with the base unit 102 or may be provided in an auxiliary device (e.g., a smartphone) that couples to the processor 130 via one or more wireless transceivers 146, 150. The transceivers 146, 150 may support one or more protocols, for example 5G, Bluetooth, NFC or WiFi. The display 101 may display text, picture or video animations based on a gesture input. The processor 130 and memory 156 may be configured with one or more modules for speech to text conversion, gesture to speech conversion, or gesture to text conversion. In an alternative, the display 101 may be used as a user interface for configuring the GR device. The controller may include a motion controller 152 for driving an electric motor of a rotational, vibrational, or pulsating feature installed near an externally-facing surface, e.g., at block 116 in base unit 102. The controller 106 may include an ambient light sensor 134 to detect ambient light levels, a skin conductance sensor 136 for biometric sensing, a proximity detector 148 to detect when the device is in proximity of other connected devices, an RFID sensor 140 for reading identifiers from an RFID device 168 of the elongate unit 104 or other device, a particle (e.g. smoke or vapor) emitter for special effects, and a geolocating device (GPS) receiver 154.

It may be advantageous to locate certain sensors or output devices at, on or near an external surface of the GR device 100, for example at block 114 (Auxiliary 1). Suitable devices located may include, for example, a biometric sensor such as an electrode array to detect heart rate of the user, a thermistor to detect skin temperature, the skin conductance sensor 136, the particle emitter 144, a scent detector or emitter, a fingerprint reader for user authentication, and/or a heating element to enable the device to heat or cool based on gesture input.

In various embodiments, an ancillary controller 160 may be used to augment capabilities of the primary controller. As illustrated, the ancillary controller includes a processor 162 and memory 164 holding program instructions for controlling one or more LEDs 120 and an ancillary audio transducer 166. The controller may include an ID device 168 for positively identifying the model and serial number of the elongate unit 104, in support of interchangeable variety in program functions and system security. The controller 160 may include any one or more devices and sensors described in connection with 106, for example, a second IMU. Separated IMUs in the base and elongate units 102, 104 may be useful for more sophisticated gesture recognition, especially for flexible GR devices. For example, a glove configured as a GR device with multiple IMUs to capture motion of each separately movable part of a hand may be used to detect the full complexity of human language (e.g., American Sign Language). In embodiments, the 162 and memory 164 may be omitted, and local processing may be implemented only in the base unit 102, e.g., processor 130.

Figure 2:
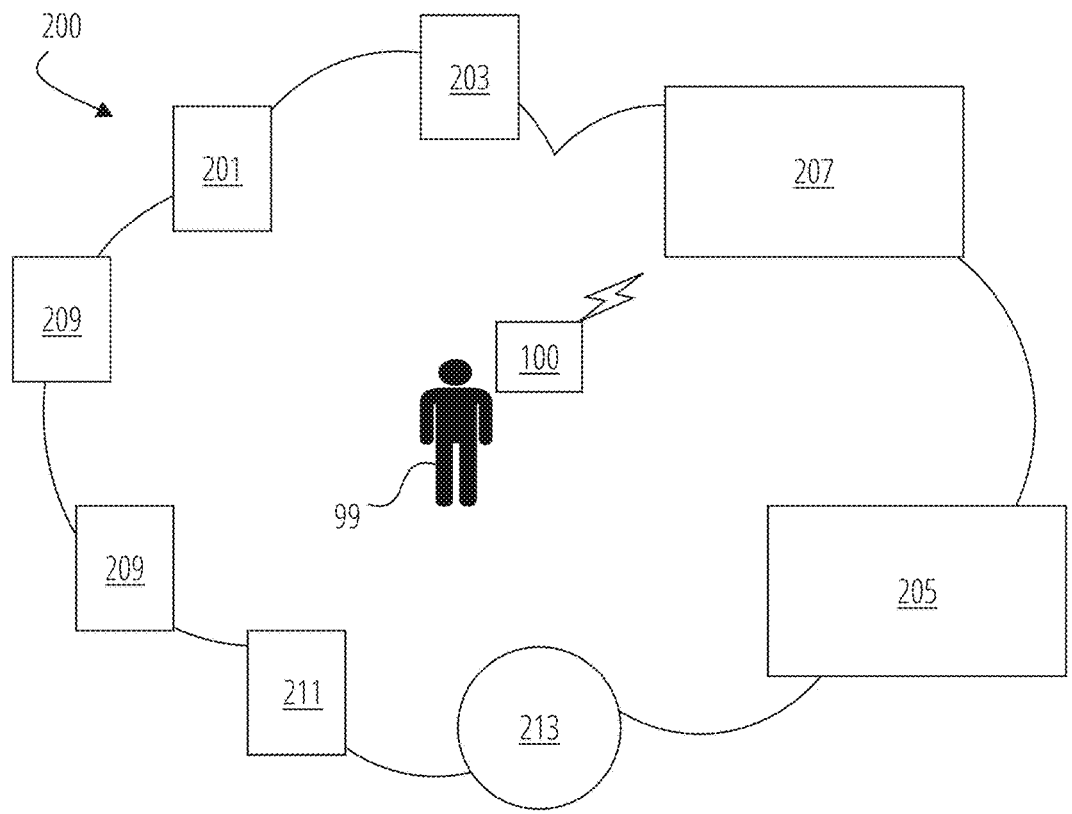
FIG. 2 is a diagram illustrating use cases for a GR device in a connected environment.

Before describing more technical features of the GR device and related systems and methods, applications for gesture recognition by a GR device will be described, in context of a connected environment 200 as shown in FIG. 2.

In an aspect, a GR device 100 may be configured as an Internet of Things (IoT) device, for example, a camera 101 or a light control module 203 may be controlled by the GR device 100. The GR device 100 may be configured to activate other connected devices based on gestures and/or voice commands of a user 99. For example, gestures can be used control lights, fans, air conditioners, toasters, refrigerators, doors, garage doors, cars, vacuum cleaners and other home appliances. In some implementations, the CR device can directly interact with another IoT device. However, in other implementations, the GR device may be configured to interact with other IoT devices through an intermediary system such as, for example, Google Home, Alexa, or other IoT hub.

In another application, a GR device may be configured to interact with a variety of toys 211, 213 (e.g., balls, cars, vehicles, dolls, robots, etc.) For example, gestures by the user 99 holding the GR device 100 may be used to control movement of a vehicle, a ball, or a figure (e.g., doll or robot). The toys may be configured as IoT devices, or as wireless devices configured for direct connection to the GR device or indirect connection through an auxiliary device(s).

In other applications, a GR device 100 may be used to provide a variety of augmented reality (AR) or virtual reality (VR) experiences 209. Gestures may be used to control virtual objects in a VR environment, for example, by communicating gestures detected by the GR device 100 to a VR device worn by the user to control one or more virtual objects. Gestures may also be used to control virtual objects in an AR environment. In this scenario, one or more virtual objects can be overlaid over objects in the real world (e.g., a virtual ball/feather is placed on a table in the real world). The gestures detected by the GR device 100 may be communicated to the AR device 209 worn by the user to control one or more virtual objects.

A GR device may be used to enhance entertainment presented over a television 205, notepad computer 209, projector 207, or other content delivery device. For example, gestures made with the GR device may be used to interact with real and/or virtual objects or projected images to unlock additional content and/or bonus features (e.g., additional scenes, making of the scene, etc.) in an entertainment setting (e.g., at a theater/a theme park/cruise ship/some other entertainment setting). Gestures with the GR device may be used to enhance the experience of watching a movie or playing a game. For example, gestures can be used to add content to a scene when watching a movie or a game. As another example, gestures can be used to control the narrative of a movie. The device can light-up, vibrate and/or buzz at climactic movements while watching a movie or a show.

In the area of retail sales, a GR device 100 may be configured to identify an item selected by the customer using gesture control. If the item is wearable (e.g., clothing, footwear, headwear, accessory, or the like) a retail experience system in communication with the GR device 100 may be further configured to display or project an image of the customer wearing the selected item in the customer's size based, on a gesture made by the GR device 100. The image can be displayed on a display device (e.g., a smart phone, a smart mirror, a computer, a smart pad, etc.) or projected in the ambient environment. The customer can use gesture control to change the size and/or color of the selected item of clothing/shoe. The customer can perform another gesture to buy the selected item of clothing/shoe. The selected item of clothing/shoe can be delivered to a preferred location of the customer.

For social applications, a GR device 100 may be personalized to the user. For example, a GR device 100 may be configured to recognize the user's biometric/voice and retrieve personal information associated with user (e.g., name, birthday, affiliations, preferences, and so forth). As another example, a GR device 100 can provide a unique user identifier to a user recognition system which can further retrieve personal information associated with user (e.g., name, birthday, affiliations, preferences, and so forth). The retrieved personal information can be used to recognize the user at theme parks, retail locations, theaters, or other venues; keep track of rewards, offer redemption of rewards, provide personalized service, customize offers, or other communication actions. Personal information retrieved with permission via a user's GR device can be used to greet the user upon entry into a space, alter the colors or other decorations of the space to reflect the user's affiliations/preferences. The retrieved personal information can also include a list of the user's friends or other people associated with one or more social groups that the user belongs to. The GR device may be configured to receive information of the user's friends or other people associated with one or more social groups that the user belongs to in the user's vicinity and alert the user to their presence to facilitate social interaction. Further to enhance social communication, a GR device may be equipped with gesture to speech conversion or gesture to text conversion capabilities. Accordingly, a GR device may facilitate communication between individuals who don't speak the same language. These capabilities can also be beneficial to individuals with disabilities. As a geospatial locating device, a GR device may be used as, or as part of, a navigation instrument capable of providing turn by turn directions from origin to destination to a user.

A GR device may be used to enhance a consumer experience at a retail location and encourage sales. In an illustrative application, a user is notified via an application (e.g., a magic/fantasy app) on a personal smart device (e.g., an Android device, iPhone, etc.) that he/she is now eligible to purchase an item (e.g., a special robe, a special toy, an accessory, etc.) from a retail location. The user's arrival at the retail location may be communicated by the application on the user's personal smart device to a user arrival notification system located in the vicinity of entrance of the retail location. Thus, when the user arrives at the retail location, a retail greeting system or the application may welcome the user with a personalized greeting. The personalized greeting may include, for example, the user's name, the name of the item they wish to purchase, the area of the retail location where the item is stored, and other pertinent information.

Figure 3:
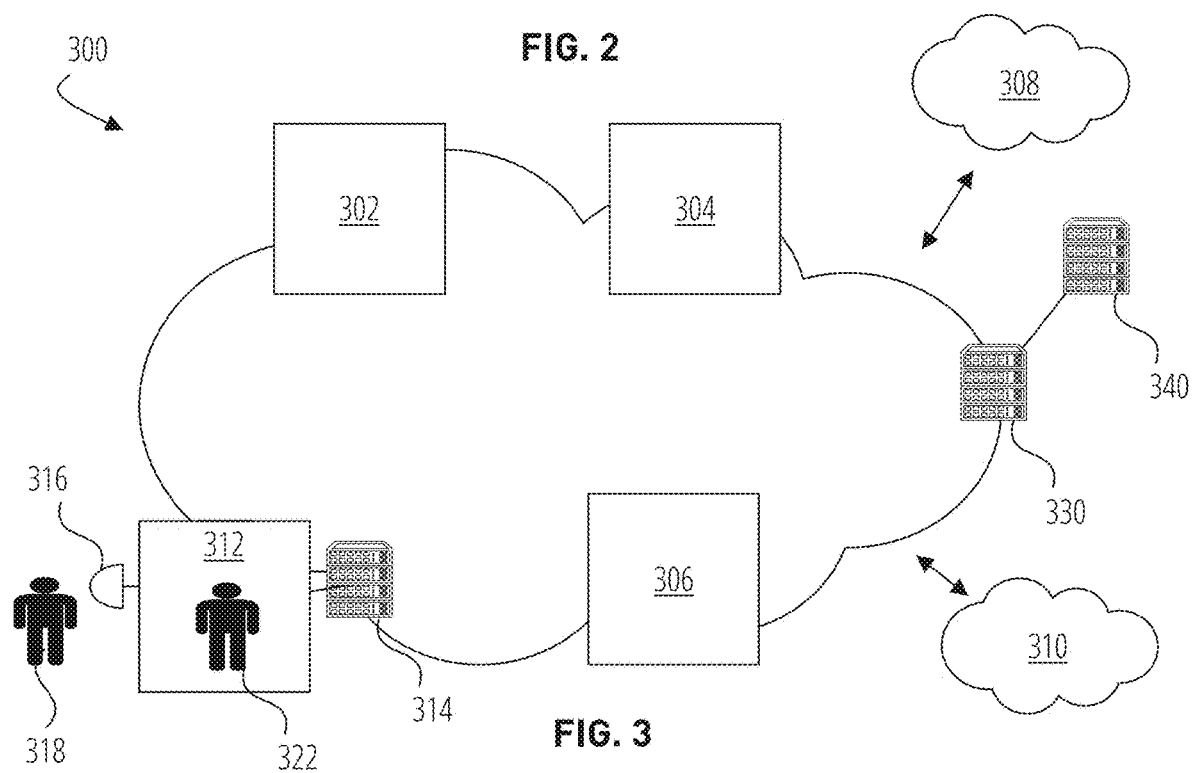
FIG. 3 is a diagram illustrating a smart retail environment embodying an aspect of a system for providing a personalized experience.

The user arrival notification system may be a part of a smart retail infrastructure 300, illustrated in FIG. 3. The user arrival notification system can include a communication system configured to receive information from the application on the user's personal smart device. An implementation of a smart retail infrastructure is described below. In some implementations, the smart retail infrastructure may receive some or all the relevant user information from the application on the user's personal smart device at the time of receiving the user's arrival information. For example, the smart retail infrastructure may receive some or all the relevant user information from one or more databases (e.g., databases located in the cloud). The relevant user information may be retrieved from the cloud based on information received from the application on the user's personal smart device.

At the retail location, the user may be provided with a generic wand (e.g. GR device 100) if the user doesn't already have a personal wand of their own. The wand can be configured to guide the user to the location where the item to purchase is located. For example, the wand may vibrate or illuminate when the user points the wand in the direction of the location of the item to purchase. The wand may be used in conjunction with a map of the retail location that is displayed by the application on the user's personal smart device. The wand may be configured to provide turn by turn directions to the user in the retail location to guide the user to the location of the item to purchase. The wand may be configured to buzz, vibrate, become hot/cold, light-up and/or point to guide the user to the location of the item to purchase.

Upon reaching the location of the item to purchase, the smart retail infrastructure may prompt the user try on the item for size when the item to purchase is an article of clothing, footwear, headgear, eyewear, jewelry or some other wearable accessory. The smart retail infrastructure may prompt the user via the user's personal smart device, via speakers deployed in the retail location and/or via speaker of the wand. In some implementations, the user may try on the item virtually.

In an aspect, the smart retail system may include a smart mirror 312, comprising a computer display coupled to a camera 316, and a video server 314. The smart mirror at the retail location may display an image 320 of the user 318 wearing the article of clothing, footwear, headgear, eyewear, jewelry or some other accessory 322 (headgear only shown). In another aspect, the smart mirror can be configured to detect and note the user's emotional response to the appearance in the smart mirror, for example the user's facial expression indicating satisfaction or displeasure. In some implementations, the smart mirror and/or the application on the user's personal smart device may offer size or color recommendations to the user. The size or color recommendations may be made based on the user's preference, the detected emotional response with the item being tried on and other considerations. A display or audio output of the smart mirror 312 or the application on the user's personal smart device may request the user to confirm the color and/or size of the item and perform a predetermined purchasing gesture if the user wants to purchase the item. The purchasing gesture may be detected by the GR wand and transmitted to the smart retail infrastructure directly or via the user's personal smart device. Upon receiving notification of the purchase, the smart retail infrastructure may be configured to trigger congratulatory messages (e.g., triggering a light show in the vicinity of the user, causing the wand to light up/buzz/vibrate, issue verbal confirmation of the purchase, etc.) to confirm the purchase. The user may be notified (e.g., via the smart personal device) that the item will be delivered to a preferred delivery location.

The application on the user's personal smart device may be configured to notify the user regarding the presence of friends and/or other members in the user's social groups in the retail location. The application on the user's personal smart device may display the location of the user's friends and/or other members in the user's social groups on a map. The wand in conjunction with the application on the user's personal smart device may guide the user to the location of the user's friends and/or other members in the user's social groups. The map of the retail location may reveal hidden places within the store location which are accessible to the user and his friends. Special items and/or discounts may be available to the user and his friends when the access the hidden places through the map.

The retail location may include other activities to facilitate social interaction, such as, for example, photobooth, food stalls, etc. Further details of a smart retail infrastructure 300 may include a plurality of retail locations 302, 304, and 306 connected to the smart retail infrastructure 300. Each retail location 302, 304, and 306 may be associated with a unique store identifier. Each retail location may include a plurality of connected devices, such as, for example, communication devices at the entrance and various other locations in the retail location, lights, projectors, televisions, speakers, microphones, or other connected devices. The plurality of connected devices in each retail location are a part of the smart retail infrastructure 300. The smart retail infrastructure can interface with other cloud infrastructures 308 and 310.

The smart retail infrastructure 300 may include information regarding the capabilities of the various connected devices in each retail location. Accordingly, the smart retail infrastructure can customize the user experience in each retail location based on the capabilities of the various connected devices in each retail location.

For example, if a retail location 306 does not have a smart mirror, then the smart retail infrastructure may prompt the user to use his/her personal smart device to virtually try on the item to purchase. As another example, if the lights in the retail location 304 are not capable of changing colors, then the smart retail infrastructure may not use the light effects in creating user's retail experience.

In some implementations, each retail location may be provided with edge computing device or server 330. In such implementations, the capabilities of the various connected devices in the retail location may be stored at the edge of the smart retail infrastructure within the edge computing device 330. A central processor 340 of the smart retail infrastructure may create a user experience that is common to all the retail location assuming full capabilities of the various connected devices. Individual edge computing devices may tailor the user experience for the individual retail location based on the capabilities of the connected devices.

Figure 4:
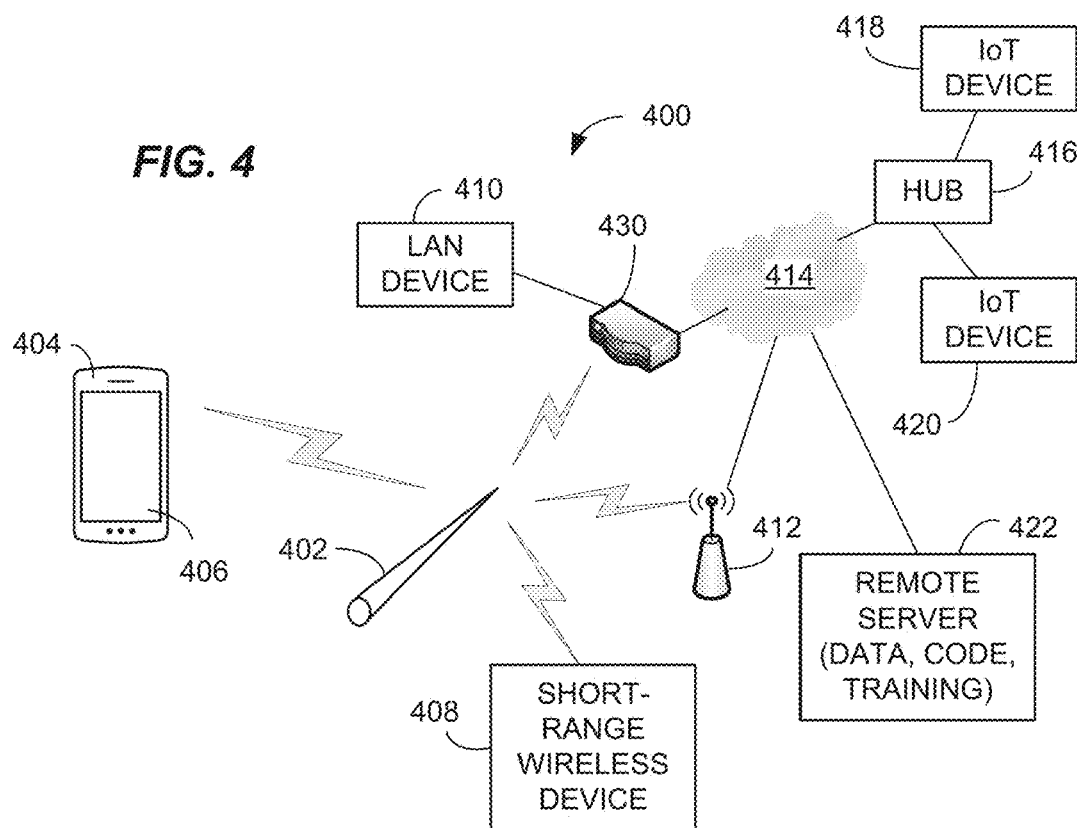
FIG. 4 is a system diagram illustrating hardware components of a system for providing a personalized experience, including a GR device.

FIG. 4 shows additional components and aspects of a gesture recognition system 400 for use with applications described herein, for interacting with a GR device 402, which may be the same as or similar to the GR device 100 previously described. The system may include a smartphone 404 with touch screen display 405 in wireless communication with the GR device 402. The GR device 402 may communicate with local connected devices, e.g., LAN client device 410, via a router 430. The GR device may communicate with a short-range wireless (e.g., Bluetooth) client device 408 via a peer-to-peer wireless link. The GR device 402 may communicate with wide area network (WAN) IoT clients 418, 420 via a hub server 416 (or without the hub, as applicable), WAN 414 and router 430 or wireless access point 412. Likewise, the GR device 402 may connect with one or more remote servers 422, that may provide resources for gesture recognition, for example, library data, or code execution for gesture recognition or gesture recognition training. For example, a remote server 422 may classify gestures by type and associate the action identifiers and gesture types, while characterizing a movement pattern as digital data is done by a processor of the GR device. In various implementations, the GR device may initiate the first step in a gesture recognition process—converting a gesture into a wireless, machine-readable signal that can be characterized by type—without performing later operations in a chain of causation between a gesture by the user and an action by a target device. In other embodiments, the GR device may perform later operations in the chain of causation.

Figure 5:
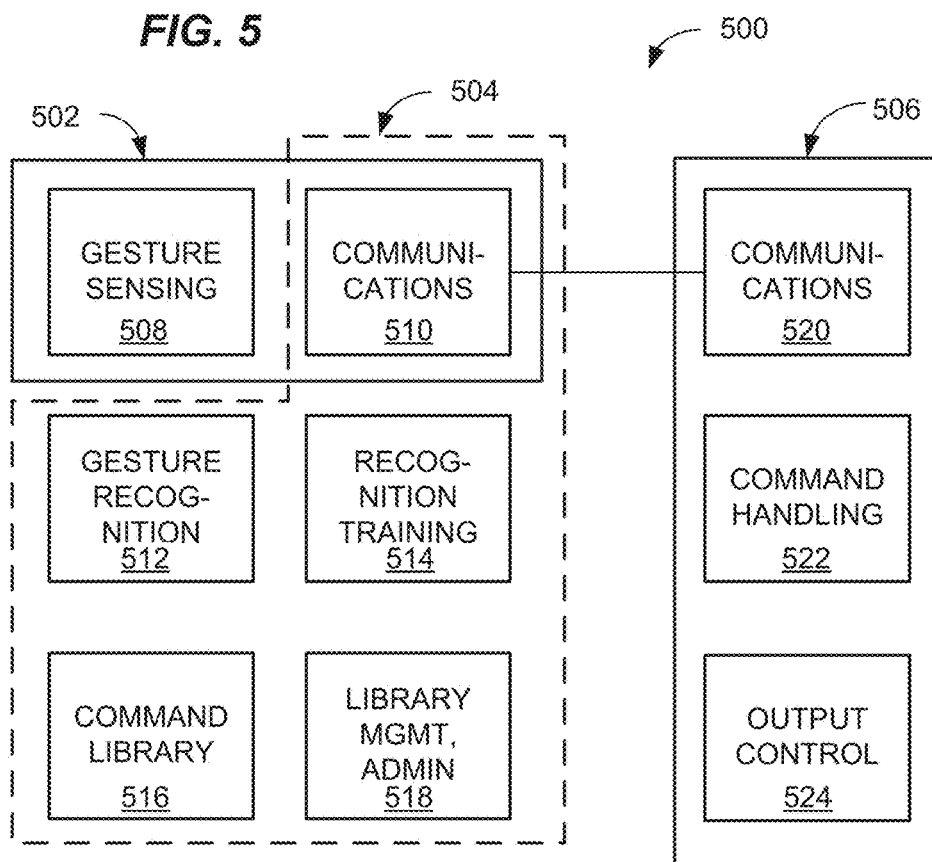
FIG. 5 is a block diagram illustrating programmable components of a system for providing a personalized experience, including a GR device.

FIG. 5 shows programmable components of a GR system 500 for providing a personalized experience, including a GR device. Block 502 encompasses critical components of a GR device for local execution. Dashed block 504 encompasses components that may be executed by a remote server, by the GR device, or both. Block 506 encompasses components of a connected device that performs an action determine by the GR system 500, for example connected clients as described in connection with FIG. 2. Gesture sensing 508 is performed locally by sensors and at least one signal processor of the GR device, as the user moves the GR device in space. As used herein, gesture sensing can refer to the detection of pattern of movements. The GR device and remote server, if any, may include a communication module 510 for communicating data and instructions with each other and with the connected client 506 via its communication module 520, which may be, or may include, for example, a standard IoT interface. The GR device 502 and/or remote server 504 may include a gesture recognition module 512 that classifies certain patterns of movement into specific categories, also called types or gestures. The GR device 502 and/or remote server 504 may further include a command library or data structure module 516 that associates gestures with action identifiers (e.g., commands).

The GR device 502 and/or remote server 504 may further include a training module 514 for configuring new patterns of movement as gestures to be recognized by the system 500. Thus, a user may configure their own gestures and expand their gesture libraries. The GR device 502 and/or remote server 504 may further include an administration and management module 518 for adding, deleting, and editing entries in their command library. Thus, a user or administrator may manage and alter library content for changing circumstances and needs.

A client device 506, also called a target or target device, need only be capable of receiving a command via a communications module 520, processing the command signal by an information processing (including command handling) module 522, and controlling its output accordingly via an output control module 524. Communications protocols used by the client 506 may be standard protocols, e.g. IoT, Bluetooth, so connection with any device capable of connecting via a common protocol is possible.

Figure 6:
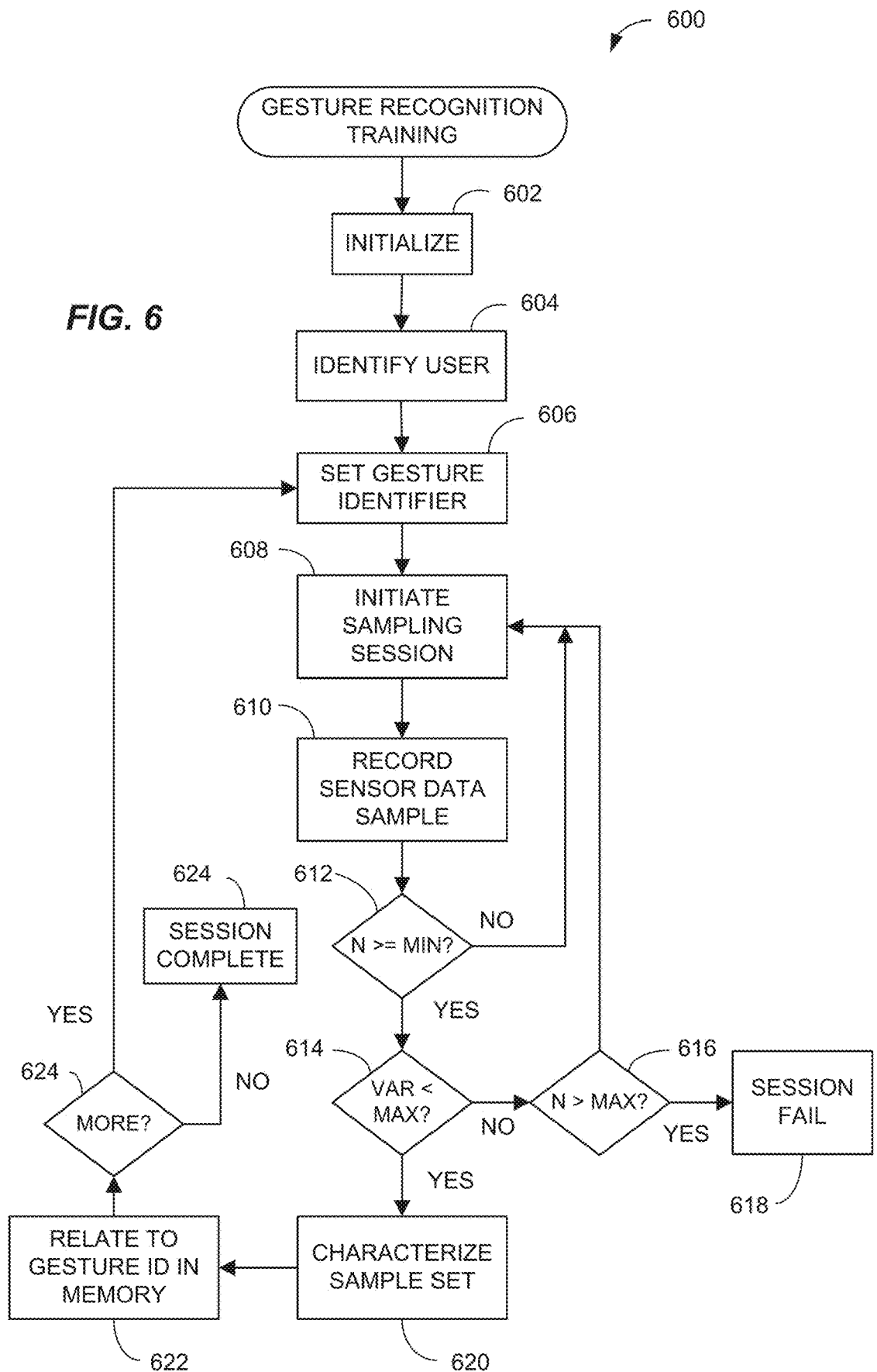
FIG. 6 is a flow chart illustrating aspects of gesture recognition training for use in or with a GR device.

Before a GR system (e.g., system 500) can recognize a pattern of movements, it may need to be programmed or trained to do so. Rules-based algorithms for pattern recognition may be programmed manually or semi-automatically, while heuristic algorithms (e.g., neural networks) may be trained using training sets. In both cases, an envelope for each gesture is defined. Gestures that fall within the envelope are classified (recognized) while those that fall outside the envelope are not classified (unrecognized). FIG. 6 shows aspects of gesture recognition training method 600 for use in or with a GR device and/or system 100, 402, 500. Gestures may be personalized for each user or user cohort, standardized for all users, or defined by both standard and personalized factors.

At 602, a processor initializes a training session, for example, in response to user or system input requesting training for a new or existing gesture. At 604, the processor may identify the user of the GR device, which may determine which gesture library the gesture belongs to. At 608, the processor may initiate a sampling session, for example, immediately after causing the GR device to emit an audible tone indicating training is to begin. At 610, the processor records motion sensor data for an interval of time, or until motion ceases, depending on the type of gesture. At 612, the processor determines whether a number of recorded samples 'N' is greater or equal to a minimum number of samples. If N is less than a minimum needed to characterize a gesture envelope, the processor reverts to record another sample at 608. If N is not less than a minimum, then the processor at 614 determines whether variance between recorded samples is less than a threshold of maximum acceptable variability. If variability is too high and the number of samples recorded exceeds a maximum number at 616, the training session fails at 618. If variability is too high and the number of samples recorded does not exceed the maximum, then the processor reverts to record another sample at 608.

If variability is within acceptable limits at 614, then the processor characterizes the sample set for the gesture at 620. For a rules-based recognition algorithm, a sample may be characterized using statistical tools, for example, mean and standard deviation, in comparing motion values across comparable intervals of time. For heuristic algorithms, a neural network or other heuristic process receives feedback from the user regarding acceptable and unacceptable sample gestures until it can accurately predict whether a motion pattern qualifies as a gesture.

At 622, the processor relates the data characterizing the gesture envelope (e.g., statistical ranges or parameters of a heuristic machine) to the identifier determined at 606 in computer memory, for example, in a library database. At 624, if the user wishes to train the system for another gesture, the processor reverts to block 606 for a new identifier. Otherwise, the processor completes the session at 624, for example by signaling the user and/or other devices in the system that the training session is complete.

FIG. 7 shows aspects of a method 700 for characterizing a data signature for use in or with a GR device. The method may be used whenever desired to receive and recognize gesture input for applications as described herein. At 702, the processor waits for gesture input to begin. To avoid wasting processor resources, a user may deactivate the GR device's sensing capability when not needed, to prevent continual processing of random movement data. Thus, a trigger for gesture sensing may include a manual activation of the sensing function coupled with movement of the GR device. Manual activation may include, for example, receiving a spoken command, e.g., "abracadabra!" from the user. At 704, the processor waits until a trigger is received. Once the trigger is received, at 705 the processor receives 3D motion data from one or more IMU sensors. The data may include 3 spatial, 3 rotational, and 3 geospatial orientation axes as previously described, or some lesser subset of these 9 axes.

At 710, the processor determines whether any auxiliary data (e.g., a verbal command, or other input) is to be included as input to defining the gesture signature. This may be determined, for example, based on user preferences or other definition of data making up gesture input. Auxiliary data from a local microphone 712 may be used to supply a verbal component, such as a word or sound that included as part of the gesture. A location sensor 714 or example a GPS sensor, may be used to provide location data to constrain operation of the gesture to the present location. A network sensor 716 may similarly be used to provide network address data to constrain operation of the gesture to definite nodes of a network. Gesture definition is not limited by these examples. At 718, the processor receives the auxiliary data contemporaneously with receiving the motion data 706, or a short interval before or afterwards. At 720, the processor applies filers and transformations (e.g., Fourier transforms) to efficiently encode the gesture data for later recognition. An encoded gesture may be referred to herein as a "signature" or "gesture signature." At 722, the processor outputs the signature for downstream processing.

Figure 8A:
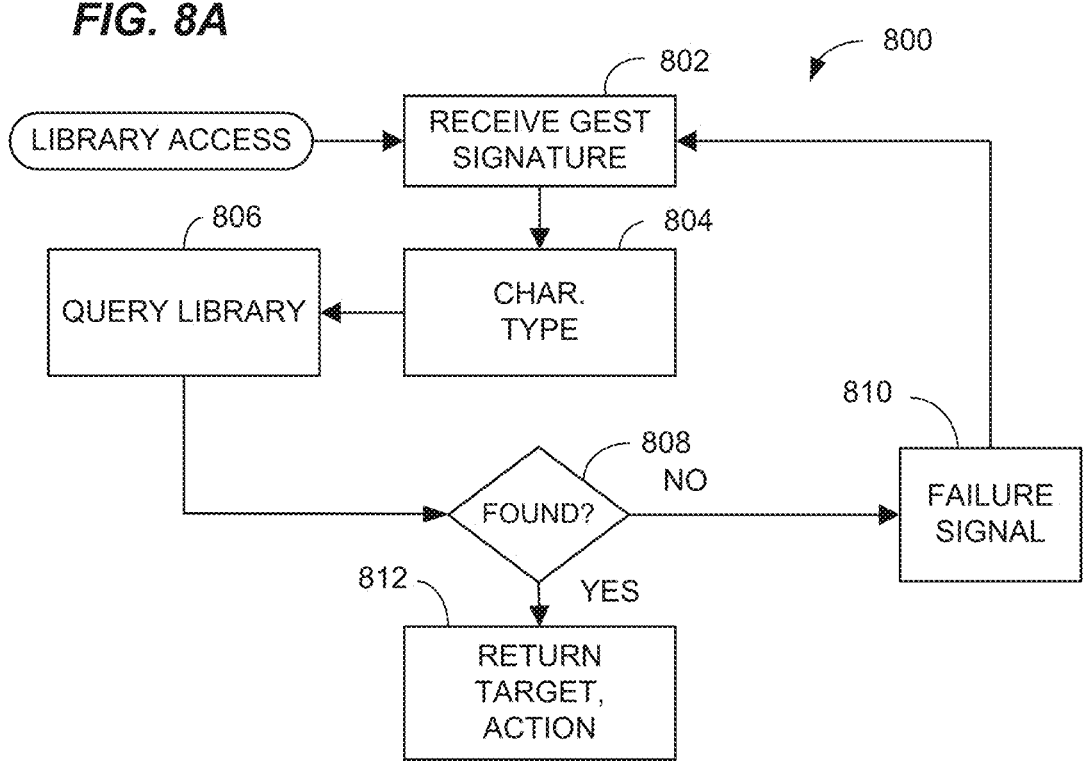
FIG. 8A-B are flow charts illustrating aspects of accessing a library of gesture-action associations and recognizing a gesture type.
Figure 8B:
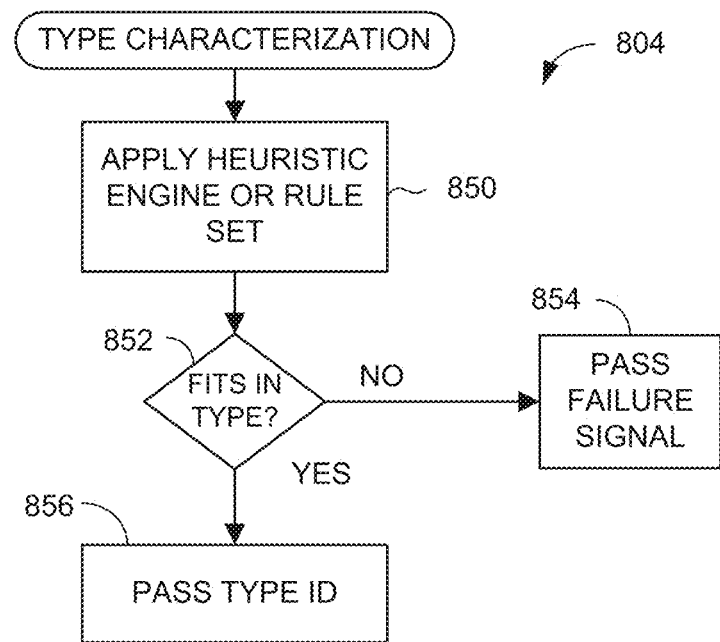

FIG. 8A-B show aspects of a method 800 for accessing a library of gesture-action associations and a related method 804 for recognizing a gesture type. At 802, a processor of a GR device or system receives a gesture signature. At 804, the processor classifies the character as a type, or as unclassifiable. At 806, the processor queries the user's gesture library by gesture type. If the gesture type is in the library at 808, the processor returns at 812 an identifier for a target client or clients and an identifier for at least one action associated with the gesture type, for use in controlling the targeted client or clients. If the gesture type does not exist in the library, or if the gesture is not classified, then the processor may provide a failure signal at 812.

FIG. 8B shows further details of gesture classification 804. At 850, the processor applies one or both of a heuristic or rules-based classification engine to the gesture signature. If using a heuristic algorithm, the processor may retrieve parameters for a heuristic engine trained on the user's gestures, populate the engine with the parameters, and process the signature using the populated engine. For a rules-based algorithm, the processor may select a class with the best fit across multiple measures of the movement (e.g., velocity, direction, acceleration, rotation, location) for each interval of time, and determine, for the best-fitting class, whether the fit satisfies a minimum threshold of similarity. At 852, if the signature fits within a type, the processor may pass the type identifier; otherwise, it may pass a failure signal at 854.

Figure 9:
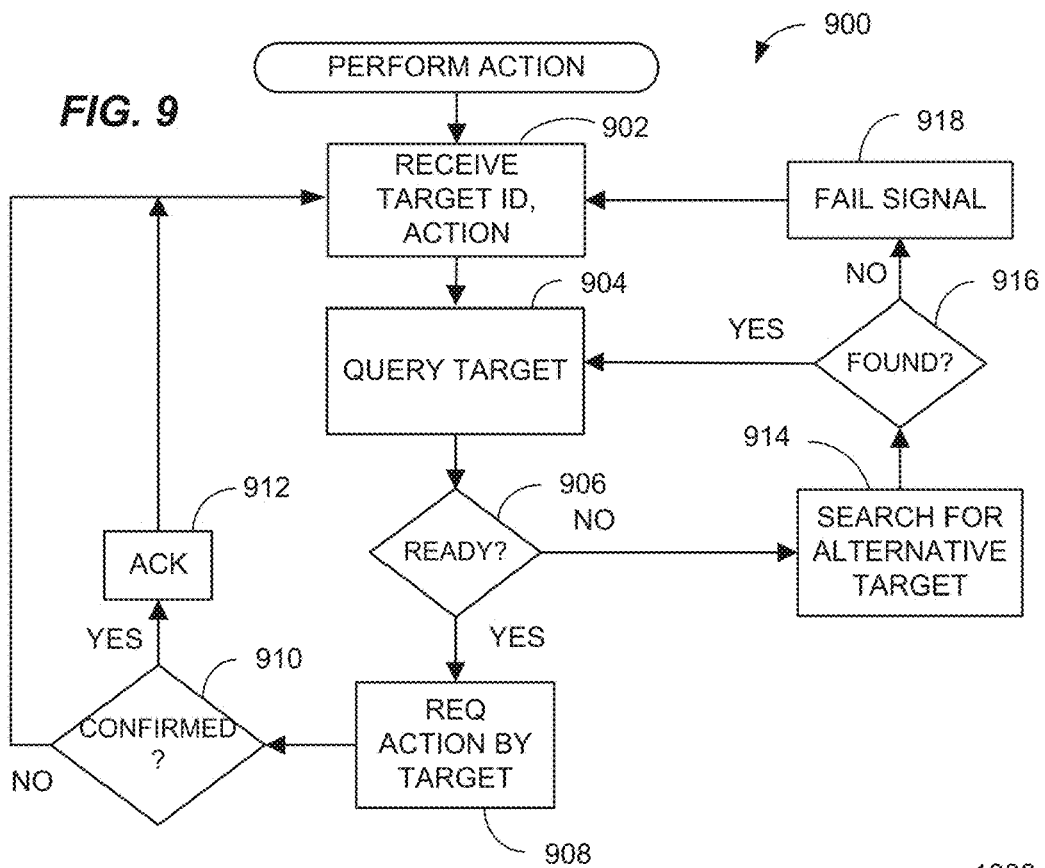
FIG. 9 is a flow chart illustrating aspects of performing an action specified by a gesture.

FIG. 9 shows aspects of a method 900 for performing an action specified by a gesture. At 902, the processor of a GR device or system may receive a target identifier and an action identifier. At 904, the processor queries the identified target using the action identifier, according to a query protocol for the target. At 906, the processor determines, based on a query response, whether the target is ready to perform the identified action. If the target is not ready, the processor may determine if an alternative or additional target is available at 914. If an additional or alternative target is available, the processor may revert to block 904, query target. If no other target is available, the processor may provide a fail signal at 918 and revert to 902 for the next requested action. If the target is ready at 906, the processor may request that the target perform the action at 908. At 910, the processor confirms that the action is performed, for example by receiving a signal from the target, or sensing a change in the environment caused by the action. If the performance is confirmed at 910, the GR device or system may provide an acknowledgement signal to the user, target, and/or administrative component of the GR system, and revert to block 902 for the next action. If the performance is not confirmed, the processor may revert directly to block 902.

Figure 10:
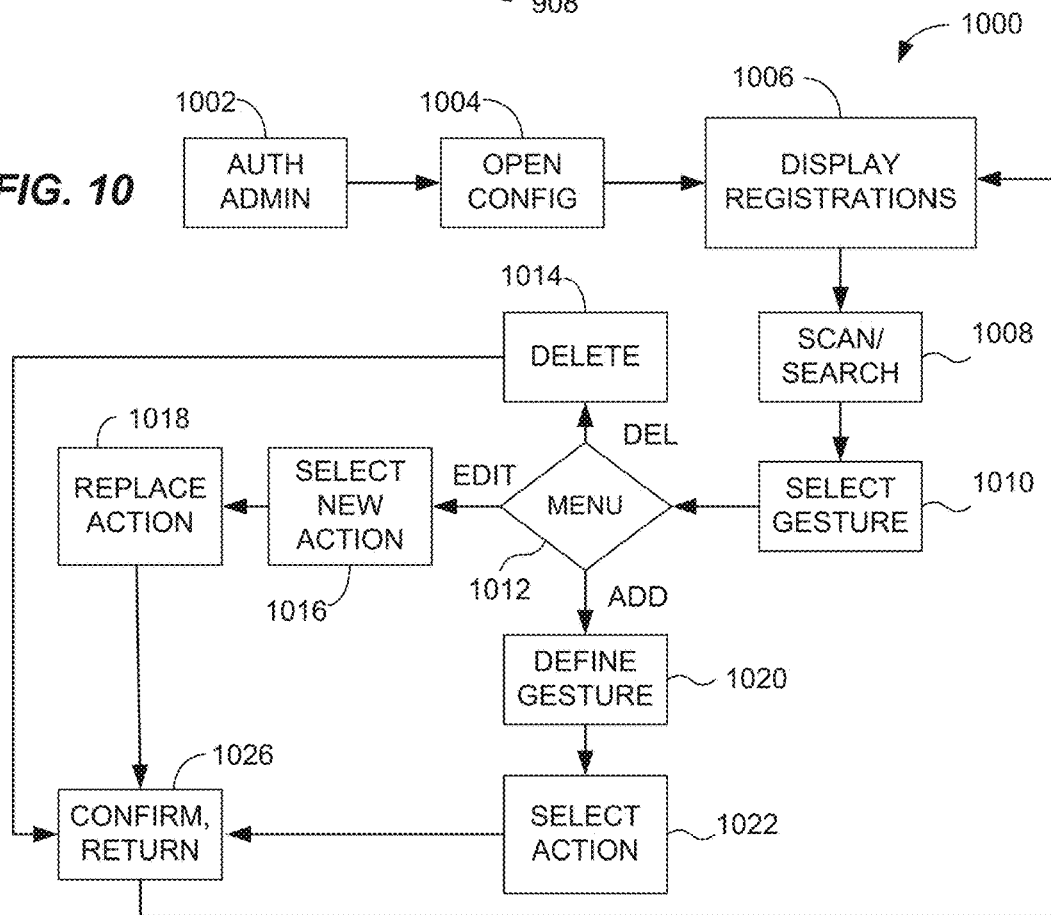
FIG. 10 is a flow chart illustrating a process for building or adding a personalized gesture library for use in or with a GR device.

FIG. 10 shows a process 1000 for building or adding a personalized gesture library for use in or with a GR device, such as may be performed by a administrative component of a GR system. At 1002, a processor of a GR device or system may authorize a user to edit a specified library of associations between action identifiers and gesture identifiers. At 1004, if the user passes authentication, the processor may access a configuration file specifying associations for the library. At 1006, the processor may output a display of current registrations, such as a list of gesture identifiers and associated action identifiers, using human-readable descriptions. At 1008, the processor may scan or search the configuration file to find a record requested by the user. At 1010, the processor may display a gesture returned by the search. In an alternative, the processor may omit the search 1008 and display 1010 if the user does not specify any gesture.

At 1012, the processor may present the user with a menu, including at least three possibilities: delete selected gesture, edit selected gesture, or add new gesture. If the user selects "delete," the processor may delete the gesture record at 1014, and at 1026, confirm the deletion and return to 1006 until user editing is finished.

If the user selects "edit," the processor may enable user selection of a new action and/or target, at 1016. For example, the processor may present an interface enabling user selection of a target from targets available to the user, and an action from available actions for each target. At 1018 in response to a user selection, the processor may replace the prior action and/or target in the configuration record with the newly selected action and/or target. Then the processor may confirm the change at 1026 and revert to the registration display until the user editing is finished.

If the user selects "add new action" at 1012, the processor may define a new gesture at 1020, for example, using the method 600 described in connection with FIG. 6. At 1022, the processor may enable user selection of any available action and/or target, for example as described in connection with block 1016. At 1026, the processor may confirm the change at 1026 and revert to 1006.

In accordance with an embodiment, as described above, the user may create corresponding gestures, which should not be construed to be limiting the scope of the disclosure. Notwithstanding, the disclosure may not be so limited, and in accordance with another embodiment, the gestures may be pre-programmed and stored within a gesture recognition system, that may execute within and/or in the background of an application of an external electronic device (such as a mobile device).

FIG. 11 shows a method 1100 for controlling a GR device to provide a gesture-centric user interface for controlling one or more connected devices.

In accordance with the foregoing, and by way of additional example, FIG. 11 shows more general aspects of a method or methods 1100 according to one embodiment, as may be performed by one or more processors of a GR device or system as described herein. It should be appreciated that the more general operations of method 1100 may include or embody more detailed aspects of corresponding methods described herein above.

Referring to FIG. 11, a computer-implemented method 1100 for providing a gesture-centric user interface for multiple target devices may include, at 1110, sensing motion of a GR device comprising an inertial motion sensor in three-dimensional space coupled to one or more processors.

The method 1100 may further include, at 1120, matching a pattern of the motion to a gesture identifier. The method 1100 may further include, at 1130, determining a target device and action identifier by reference to a data structure that associates each of a plurality of gesture identifiers to a user-settable action identifier and target identifier. The method 1100 may further include, at 1140, requesting the target device to perform an action identified by the action identifier The method 1100 may include any one or more additional operations as described herein above. Each of these additional operations is not necessarily performed in every embodiment of the method, and the presence of any one of the operations does not necessarily require that any other of these additional operations also be performed. For example, optionally, method 1100 may further include a method 1000 of editing a library of gesture/action associations, or a method 600 for training a processor to recognize a gesture.

Figure 12A:
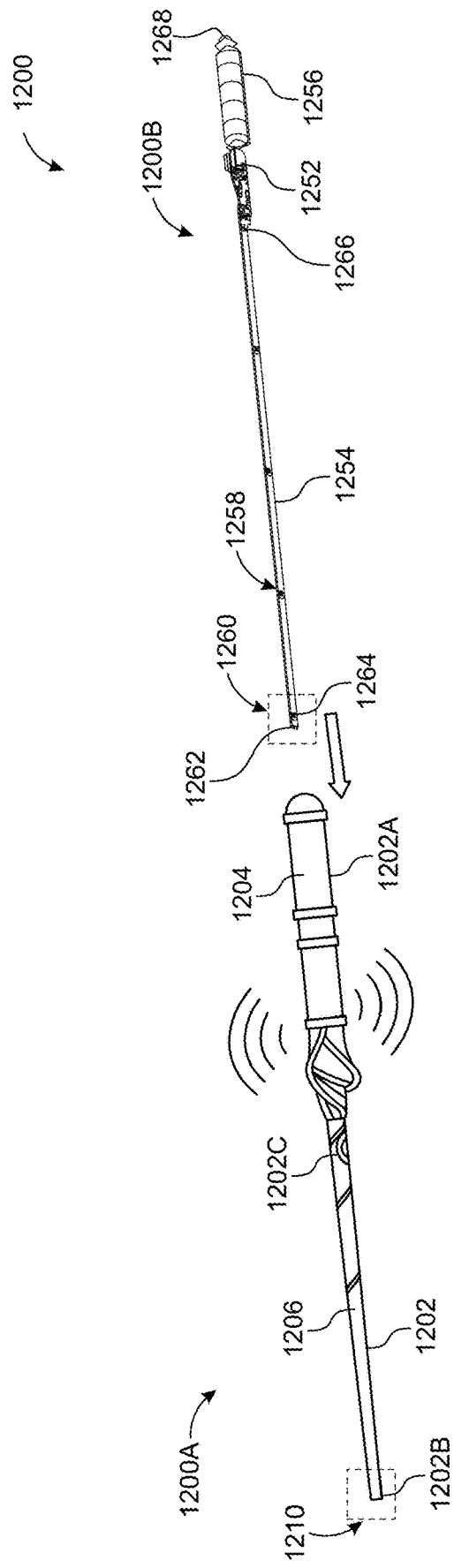
FIG. 12A is a diagram that illustrates an external view of an exemplary GR device, in accordance with various embodiments of the disclosure.
Figure 12B:
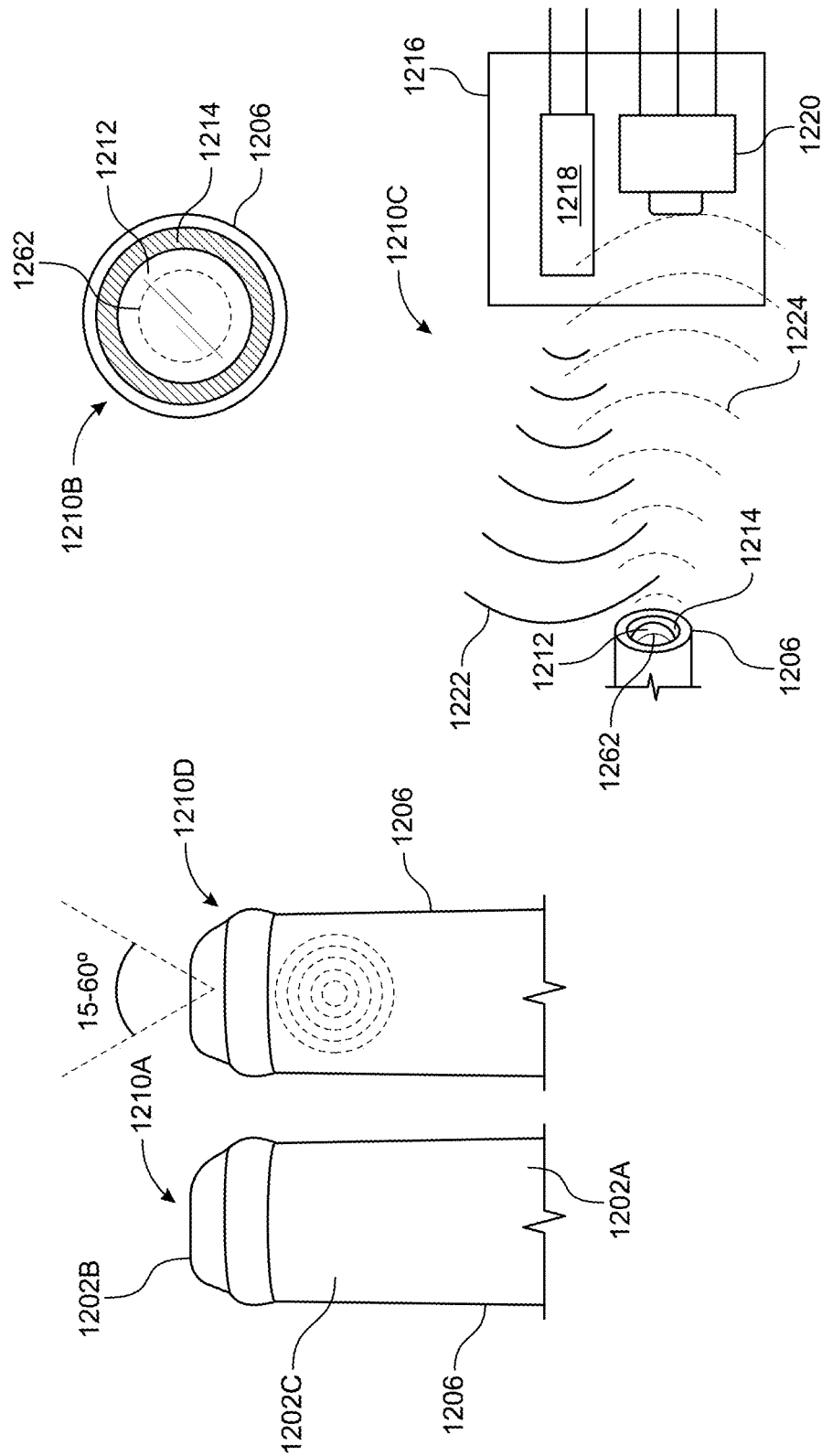
FIG. 12B is a diagram that illustrates an external view of a tip portion of the exemplary GR device, in accordance with various embodiments of the disclosure.

FIG. 12A is a diagram that illustrates an external view of an exemplary GR device 1200, in accordance with various embodiments of the disclosure. FIGS. 12B and 12C are exploded diagrams that illustrate an outer shell tip portion and a PCB tip portion, respectively, of the exemplary GR device 1200. With reference to FIG. 12A, there is shown a first external view 1200A of an outer shell 1202 of the exemplary GR device 1200 and a second external view of 1200B of an exemplary printed circuit board assembly (PCBA), such as a PCB 1250. The outer shell 1202 may be configured and/or structured in such a manner that a single PCB 1250 may be easily slid into the outer shell 1202 and coupled thereto using a fastening mechanism, such as press-and-fit clip.

The first external view 1200A of the outer shell 1202 depicts a handle 1204 and a shaft 1206. The handle 1204 may be grasped by the hand of the user 99, while the shaft 1206 provides a form factor of a wand tip extending outward from the handle 1204. The outer shell 1202 includes various portions, such as an opaque portion 1202A, a transparent portion 1202B, and/or a translucent portion 1202C, that overall provides a classic, authentic, and dynamic appearance to the exemplary GR device 1200.

The opaque portion 1202A, that may comprise metal, wood, blended polymer or a combination thereof, spans the majority of the outer shell 1202 of the exemplary GR device 1200. The opaque portion 1202A may mask the non-illuminating components of the PCB 1250 and may also add to the aesthetic appeal of the exemplary GR device 1200.

The transparent portion 1202B and the translucent portion 1202C provide an outer chassis to various illuminating components, such as a plurality of light sources 1258, mounted on the PCB 1250 when the exemplary GR device 1200 is in an active state. The transparent portion 1202B may be positioned preferably at the tip of an outer shell tip portion 1210 to provide a bright illumination when the exemplary GR device 1200 is in the active state. On the other hand, the translucent portion 1202C may be positioned above the handle 1204, at the base of the handle 1204, and at various portions along the length of the shaft 1206 of the outer shell 1202 to provide a diffused and subtle illumination when the exemplary GR device 1200 is in the active state.

The positions of the transparent portion 1202B and the translucent portion 1202C of the outer shell 1202 may correspond to the underneath positions of the plurality of light sources 1258 mounted on the PCB 1250. In other words, the transparent portion 1202B and the translucent portion 1202C of the outer shell 1202 are positioned in such a manner that when the PCB 1250 is secured inside the outer shell 1202, the transparent portion 1202B and the translucent portion 1202C appear to be mounted exactly on the top of the illuminating components of the PCB 1250 for maximum illumination. The transparent portion 1202B and the translucent portion 1202C may illuminate in multi-colours, hues, and/or with varying intensity when the user 99 activates the exemplary GR device 1200 and subsequently provides gestures to perform a specific action, to facilitate interaction with smart devices at home, franchise locations, events, and/or bespoke enchanted items, thereby providing a spellcasting and magical experience to the user 99.

The second external view 1200B of the PCB 1250 depicts a first unit 1252 and a second unit 1254. The first unit 1252 may correspond to a base unit of the PCB 1250. The base unit of the PCB 1250 may correspond to the handle 1204 of the outer shell 1202 that is configured to be grasped by hand of the user 99. The second unit 1254 may correspond to an elongate unit of the PCB 1250. The elongate unit of the PCB 1250 may correspond to the shaft 1206 that provides a form factor of the wand tip extending outward from the handle 1204.

The first unit 1252 may include active electronic components, such as the controller 106, the IMU 108 and the power storage unit 110 (as described in FIG. 1), in addition to a vibrator motor, a capacitive touch sensor, and a flex printed circuit (FPC), not shown in FIG. 12A for brevity. The power storage unit 110 may include a non-removable rechargeable battery 1256, as depicted in FIG. 12A. The non-removable rechargeable battery 1256 may be of different types, including but not limited to, alkaline, nickel-cadmium (NiCd), nickel-metal hydride (NiHM), and lithium-ion, among others. The non-removable rechargeable battery 1256 may exhibit shapes and dimensions suitable for being suitably coupled to the PCB 1250 without distorting the form factor of the handle 1204. Further, the charging capacity and cell design of the non-removable rechargeable battery 1256 may depend on load requirements. For example, for charging or powering the exemplary GR device 1200, the non-removable rechargeable battery 1256 may deliver a voltage from about 3 volts to about 4.2 volts.

The second unit 1254 extends outward from the first unit 1252 and terminates at a PCB tip portion 1260. The second unit 1254 may include a first light source 1262 and a set of second light sources, for example, a first pair of LEDs 1264 to a fifth pair of LEDs 1266, of the plurality of light sources 1258. One of the plurality of light sources 1258 may further include a base LED 1268 mounted at the base of the first unit 1252.

In accordance with an embodiment, the first light source 1262 may be an IR light emitting diode (LED) as IR transmitter. The first light source 1262, for example, the IR LED, may be configured to generate a directional beam. The directional beam of the first light source 1262 may be in IR spectrum. Generally, the wavelength of IR may vary between 780 nm and 1 mm, which corresponds to a frequency range from 300 GHz to 400 THz. In such embodiment, the directional beam of the first light source 1262 may be less than 15 degrees. However, it may be contemplated that the first light source 1262 may generate a wide angle IR illumination varying between 15 degrees to 60 degrees, without any deviation from the scope of the disclosure. Further, it may be contemplated that an IR receiver, in addition to the IR transmitter, may be side-mounted together at the tip of the second unit 1254, without any deviation from the scope of the disclosure.

In certain embodiments, the IR transmitter of the first light source 1262 may be configured to transmit IR signals having frequency with a set duty cycle, based on an instruction received from a processor or a microcontroller unit, such as the controller 106 in response to an assertion signal. In other embodiments, the first light source 1262 may be configured to be powered on/off, based on another instruction received from the processor or the microcontroller unit, such as the controller 106 in response to the assertion signal. In such embodiments, the assertion signal may be generated by one or more sensor controllers mounted at the first unit 1252 in response to one or more assertions provided by the user 99.

In accordance with an embodiment, the set of second light sources may include the first pair of LEDs 1264 to the fifth pair of LEDs 1266. The set of second light sources and the base LED 1268 may be RGB LEDs (each having three channels (Red, Green, Blue)) that may be configured to illuminate in multiple colors in visible spectrum. In certain embodiments, the second unit 1254 may accommodate twelve channels. Accordingly, four groups of LEDs may be formed. For example, the first pair of LEDs 1264 may form a first group of LEDs. The second pair of LEDs and the third pair of LEDs may form a second group of LEDs. The fourth pair of LEDs and the fifth pair of LEDs 1266 may form a third group of LEDs. Finally, the base LED 1268 may form a fourth group of LEDs. The four groups of LEDs may be configured to illuminate in multi-colours, hues, and/or with varying intensity at the same time creating an animated effect. In certain cases, the different colored channels may mix in different intensities to produce a variety of different colors based on additive color mixing. Such multi-color effect may provide an animated lighting effect to the exemplary GR device 1200 and provide a magical experience to the user 99. In accordance with another embodiment, each of the first pair of LEDs 1264 to the fifth pair of LEDs 1266 and the base LED 1268 may be single colored LEDs (each having a single channel). Consequently, each of the first pair of LEDs 1264 to the fifth pair of LEDs 1266 and the base LED 1268 may illuminate the entire second unit 1254 in a single color.

An exemplary number of the set of second light sources may be five, as illustrated in the second external view 1200B of the PCB 1250. However, the number may vary based on the length of the second unit 1254, without any deviation from the scope of the disclosure.

With reference to FIG. 12B, there is shown a first side view 1210A of the outer shell tip portion 1210 before illumination and a second side view 1210D of the outer shell tip portion 1210 upon illumination. There is further shown a top view 1210B and a perspective view 1210C of the outer shell tip portion 1210. As illustrated, the outer shell tip portion 1210 includes the opaque portion 1202A that masks the underneath non-illuminating components of the second unit 1254 of the PCB 1250. The transparent portion 1202B at the tip of the outer shell tip portion 1210 is further illustrated in the top view 1210B and the perspective view 1210C. Underneath the transparent portion 1202B, the first light source 1262, i.e. the IR LED, is side-mounted at the second unit 1254 of the PCB 1250. In certain embodiments, the outer shell tip portion 1210 may be hollow at the tip. In such embodiments, instead of the transparent portion 1202B, the outer shell tip portion 1210 may include an optical lens 1212 mounted at the hollow tip of the outer shell tip portion 1210. The outer shell tip portion 1210 further illustrates the translucent portion 1202C spanning an area underneath which the first pair of LEDs 1264 is mounted at right-angles on the top and bottom surfaces of the second unit 1254.

In certain embodiments, the exemplary GR device 1200 may operate as an active device driven by the processor or the microcontroller unit, such as the controller 106, based on assertion signals generated at the first unit 1252 of the PCB 1250. Accordingly, the controller 106 may be configured to control the plurality of light sources 1258, i.e., the first light source 1262 and the set of second light sources, for example, the first pair of LEDs 1264 to the fifth pair of LEDs 1266. The plurality of light sources 1258 may be controlled by the controller 106 to generate multiple lighting effects. More specifically, the multiple lighting effects include a first lighting effect that corresponds to a directional beam generated by the first light source 1262. The directional beam generated by the first light source 1262 may be detected by an external device, such as a target device 1216. The multiple lighting effects may further include a set of second lighting effects that corresponds to a multi-color illumination generated by the set of second light sources, i.e. the first pair of LEDs 1264 to the fifth pair of LEDs 1266. The set of second lighting effects remains unblocked or impeded by the side-mounted first light source 1262.

In other embodiments, the exemplary GR device 1200 may operate as a passive device driven by the external device, such as the target device 1216. In other words, while operating as a passive device, the exemplary GR device 1200 may not be required to be powered on. In such embodiments, as illustrated in the top view 1210B and the perspective view 1210C, the outer shell tip portion 1210 may include a doughnut-shaped portion 1214 that may be coated with an infrared reflective paint or retroreflective paint. Alternatively, the doughnut-shaped portion 1214 may correspond to an optical mirror that may be structured and/or configured to reflect back IR illumination generated by the target device 1216. It should be noted that the doughnut-shaped portion 1214 does not reflect the first lighting effect generated by the first light source 1262. It should further be noted that instead of the doughnut-shaped portion 1214, the outer shell tip portion 1210 may include a ring with one of a rounded, a demi-bullnose, a half-bullnose, a chamfer, or a bevel outer edge, without any deviation from the scope of the disclosure.

In such embodiments, the target device 1216 may correspond to an IR sensor module that includes mainly of an IR transmitter 1218 and an IR receiver 1220, in addition to supporting components, such as an op-amp and a variable resistor (not shown in FIG. 12B). The IR transmitter 1218 may be configured to emit light in the range of IR frequency. The IR transmitter 1218 may include IR LEDs that have light emitting angle of approximately 15-60 degree and variable range based on the type of IR transmitter 1218 and corresponding manufacturer. The IR receiver 1220 may include photodiodes that start conducting the current in reverse direction when light falls on it, and the amount of current flow is proportional to the amount of light. The op-amp may be configured as a comparator circuit in the IR receiver 1220. A high output of the op-amp at an op-amp output terminal indicates detection of an object, such as the exemplary GR device 1200. The variable resistor may be configured to calibrate the distance range at which the object, i.e., the exemplary GR device 1200, should be detected.

The IR transmitter 1218 of the target device 1216 may be configured to generate a wide angle IR illumination 1222. The doughnut-shaped portion 1214 of the outer shell tip portion 1210 coated with the infrared reflective paint or the retroreflective paint may reflect the wide angle IR illumination 1222 back to the target device 1216 as a reflected beam 1224 with minimum scattering. Thus, the target device 1216 may identify a directionality feature of the exemplary GR device 1200 based on the detection of the reflected beam 1224 by the doughnut-shaped portion 1214 of the outer shell tip portion 1210.

As described above, with reference to the first side view 1210A, a portion of the outer shell 1202 of the exemplary GR device 1200, i.e., the outer shell tip portion 1210 of the outer shell 1202, may be visually opaque before the illumination of the first pair of LEDs 1264 from the set of second light sources. However, upon illumination of a corresponding pair, i.e., the first pair of LEDs 1264, from the set of second light sources mounted on the second unit 1254, the outer shell tip portion 1210 may exhibit translucency and bloom radiance, as illustrated in the second side view 1210D. The corresponding pair, i.e., the first pair of LEDs 1264, from the set of second light sources is located underneath the outer shell tip portion 1210 of the outer shell 1202 of the exemplary GR device 1200. The bloom radiance, as illustrated by concentric circles in the second side view 1210D, exhibited by the outer shell tip portion 1210 of the outer shell 1202 may be based on a plurality of attributes of the outer shell tip portion 1210. The plurality of attributes may include various features associated with the outer shell tip portion 1210 of the outer shell 1202, for example a diffusing property of a polymer blend, a transmissive property, a plurality of properties of coating applied, and a coating technique applied on the surface of the outer shell tip portion 1210 of the outer shell 1202. The plurality of attributes may further comprise incorporation of the first pair of LEDs 1264 from the set of second light sources mounted at right angles at the top and bottom surfaces of the tip of the second unit 1254.

In accordance with an embodiment, the plurality of attributes may include the diffusing property of the polymer blend of the outer shell tip portion 1210 of the outer shell 1202. The outer shell 1202 may be formed using a polymer blend in accordance with one of a first, a second or a third variation. The first variation of the polymer blend may be clear and frosted. The second variation of the polymer blend may be 50-90% translucent with a color tint. The third variation of the polymer blend may be 50-90% translucent and mixed with silicon powder to increase light diffusion. In general, light rays generated by the set of second light sources, for example, the first pair of LEDs 1264 to the fifth pair of LEDs 1266, and the base LED 1268, reflect back from the surface of the outer shell 1202 at different angles in different directions resulting in scattering of light. Based on the variation of the polymer blend used for the outer shell 1202, the light rays are scattered in accordance with corresponding intensity, which determines the level of diffusion and softness of the light rays.

In accordance with an embodiment, the plurality of attributes may include the transmissive property of the outer shell tip portion 1210 of the outer shell 1202. The transmissive property is an optical property of the polymer blend of the outer shell tip portion 1210 that may be defined as the ratio of light intensity transmitted through the polymer blend to the intensity of light incident the polymer blend. In certain embodiments, the light that is transmitted is either reflected or absorbed by the polymer blend of the outer shell tip portion 1210. Thus, the transmissive property of the polymer blend may be determined by reflection, absorption and scattering. If both absorption and scattering are negligible, the polymer blend is called transparent. In contrast, an opaque polymer blend has practically zero transmissive property due to its high scattering power whereas a polymer blend with negligible absorption but with appreciable transmissive property but lower than 90% is called translucent.

In accordance with an embodiment, the plurality of attributes may include the plurality of properties of coating applied on surface of the outer shell tip portion 1210 of the outer shell 1202. The outer shell tip portion 1210 may be coated by curing and drying a mixture of film-forming materials (such as, reactive oligomers or non-reactive polymers), colorants (such as, dyes and pigments), solvents (such as, aliphatics solvent, aromatic solvents or carbonyls solvent) and other additives (such as, stabilizers and/or plasticizers) on the surface of the outer shell tip portion 1210. The thin film of the coating on the surface may exhibit various properties that include functional properties and decorative properties. The functional properties may include, for example opacity, the ability to hide a polymer blend; colour, the ability to reflect and absorb visible light of specific wavelengths; and gloss, the ability to act like a mirror in the direct reflection of light. The decorative properties may enhance the aesthetic appeal of the outer shell tip portion 1210 by accentuating its surface features or even by concealing certain portions from view. The coating for the outer shell tip portion 1210 may be categorized into two types: organic coatings, such as, alkyd coating, epoxy coating, and polyurethane coating; and inorganic coatings, such as acrylic coating, ceramic coating, and intumescent coating. It should be noted that the above instances of coatings are merely for exemplary purposes. Notwithstanding, other suitable coatings may be contemplated without any deviation from the scope of the disclosure.

In accordance with an embodiment, a degree of translucency of the outer shell tip portion 1210 of the outer shell 1202 may be based on the material that is utilized for the outer shell 1202 and coatings of paint, such as non-conductive vacuum metallization (NCVM) coating, applied on the outer surface of the outer shell 1202. For example, at the tip of the outer shell tip portion 1210, the coating is lighter to provide higher transparency and lesser translucency as compared to rest of the body of the outer shell 1202. Due to such a thin coating, brightness of the first pair of LEDs 1264 may be increased and 360-degree illumination may be provided. Over the areas of the surface of the outer shell tip portion 1210 underneath which direct illumination by any LED is not present, thick coatings of the paint may be applied to provide opaqueness to the surface. Other areas of the outer shell 1202 (that correspond to the transparent portion 1202B or the translucent portion 1202C) may correspond to the portions underneath which direct illumination is present or portions of the painted surface of the outer shell 1202 from which the light illuminates outwards. Over all such areas of the outer shell 1202 (that correspond to the transparent portion 1202B or the translucent portion 1202C), lighter or half-coatings of the paint may be applied.

In accordance with an embodiment, the plurality of attributes may include the coating technique applied on the surface of the outer shell tip portion 1210 of the outer shell 1202. The coating technique may be classified into one of a solution state, molten/semi-molten state, or gaseous state. The solution state may include electrochemical deposition or chemical deposition technique. The molten/semi-molten state may include thermal spraying or laser deposition technique, The gaseous state may include Ion Beam Assisted Deposition (IBAD), chemical vapour deposition (CVD) or physical vapor deposition (PVD) technique. The PVD technique may be further classified as evaporative or spluttering techniques. Additional techniques may include regular coating, partial reflective coating (half silvering), or dot coating. Based on one or more of the above-mentioned techniques, the surface of the outer shell 1202 may be coated fully or partially to as to provide different types of surfaces. For example, at the outer shell tip portion 1210 of the outer shell 1202, metallic coating may be applied by half-silvering technique due to which, the outer shell tip portion 1210 appears to be metallic and opaque when non-illuminated but turns translucent to provide a bloom radiance upon illumination. In another example, at the outer shell tip portion 1210 of the outer shell 1202, the coating may be partially applied as dots covering the surface. In another example, at the outer shell tip portion 1210 of the outer shell 1202, the coating may be half-coating in term of thickness and coverage on the surface of the outer shell tip portion 1210.

In accordance with an embodiment, the plurality of attributes may include the incorporation of the first pair of LEDs 1264 to the fifth pair of LEDs 1266 from the set of second light sources mounted at right angles at the top and bottom surfaces, respectively, of the second unit 1254. Such an arrangement of the set of second light sources provides a maximal 360 degrees of illumination of the outer shell 1202 at each point where the pair of LEDs are located on the second unit 1254.

It should be noted that for illustrative purposes, the bloom radiance is described to be exhibited by the outer shell tip portion 1210 of the outer shell 1202. However, other portions of the outer shell 1202 may also exhibit the bloom radiance based on the plurality of attributes associated with the portions of the outer shell 1202, as described above, without any deviation from the scope of the disclosure.

With reference to FIG. 12C, there is shown a perspective view 1260A and a top view 1260B of the PCB tip portion 1260, in accordance with various embodiments of the disclosure. As illustrated, the first light source 1262 and the first pair of LEDs 1264 from the set of second light sources are mounted on the PCB tip portion 1260. The first light source 1262 is side-mounted at the tip of the PCB tip portion 1260. A first LED 1264A from the first pair of LEDs 1264 is mounted at right angle at the top surface 1254A of the PCB tip portion 1260 of the second unit 1254. Similarly, a second LED 1264B from the first pair of LEDs 1264 is mounted at right angle at the bottom surface 1254B of the PCB tip portion 1260 of the second unit 1254. The first pair of LEDs 1264 may be positioned adjacent to the side-mounted first light source 1262. There is also shown additional electronic components 1270, such as capacitors and resistors, coupled with the first LED 1264A. Similarly, the second LED 1264B may be coupled with corresponding electronic components (not shown). In various exemplary scenarios, the distance 'L' between the first light source 1262 and the first pair of LEDs 1264 may be anywhere between 0-2 cm.

In accordance with an embodiment, the thickness of the first light source 1262 may be substantially same as thickness of the circuit board, i.e. the second unit 1254 of the PCB 1250. Further, the width of the first light source 1262 remains within the top surface 1254A and the bottom surface 1254B of the second unit 1254 when the first light source is side-mounted at the tip of the second unit 1254. In other words, the width of the first light source 1262 is near to if not flush with the top surface 1254A and the bottom surface 1254B second unit 1254 such that the first light source 1262 does not occlude the illumination of the first pair of LEDs 1264. In accordance with an embodiment, the illumination by the set of second light sources in the multiple colors is independent of the directional beam generated by the first light source 1262, side-mounted at the tip of the second unit 1254. Thus, even when the set of second light sources are illuminated in the multiple colors to generate the set of second lighting effects, the first light source 1262 can still generate the directional beam in IR spectrum.

In accordance with an embodiment, the first light source 1262 may be side-mounted at the tip of the PCB tip portion 1260 of the second unit 1254 by the technique of edge-soldering. For such side-mounting of the first light source 1262, the tip of the PCB tip portion 1260 of the second unit 1254 may include castellated vias 1272, or simply castellations. The castellated vias 1272 may be plated-through holes or vias located in the edge of the PCB tip portion 1260 of the second unit 1254. The castellated vias 1272 may be cut through to form a series of half holes, as illustrated in the top view 1260B. Such half holes may serve as contact pads that create a link between the first light source 1262 and the edge/tip of the PCB tip portion 1260 of the second unit 1254, onto which the leads of the first light source 1262 may be soldered. Upon soldering, the solder wicks and maintains the connection, but does not affect the mounting height to the first light source 1262. It should be noted that the above example of the castellated vias 1272 to provide contact pads for the side-mounting of the first light source 1262 for soldering is merely for exemplary purposes. Notwithstanding, other suitable techniques, such as PCB edge plating or side-plating may be contemplated to provide such contact pads for soldering the first light source 1262 onto the edge/tip of the PCB tip portion 1260, without any deviation from the scope of the disclosure.

In accordance with an embodiment, the first unit 1252 and the second unit 1254 may be configured to have a minimal wand form factor due to substantially high aspect ratio of the PCB 1250 that results in a long, thin, and rigid circuit board. The aspect ratio may be defined based on a ratio of the length of the PCB 1250 versus the width of the PCB 1250. The term "substantially high aspect ratio" may correspond to an aspect ratio that exceeds a threshold value. In an example, the circuit board, i.e. the PCB 1250, may be a rigid printed circuit board with an aspect ratio that corresponds to at least a difference of 70 percent between length and width of the circuit board. Accordingly, the resultant dimensions of the proposed exemplary GR device 1200, dictated by the PCB 1250 having the substantially high aspect ratio, is highly compact, minimalistic, and resistant to any sort of bending.

It should be noted that the form factor of the exemplary GR device 1200 in accordance with the first external view 1200A of the outer shell 1202 is provided merely for exemplary purposes and should not be construed to limit the scope of the disclosure. Notwithstanding, other suitable form factors of the exemplary GR device 1200 may be contemplated for being held, moved through the air, worn and/or carried by movements of the extremities of the user 99. Each form factor of the exemplary GR device 1200 may define and prescribe a particular shape, size, pattern, material, and other physical specifications, without any deviation from the scope of the disclosure.

In accordance with an embodiment, the exemplary GR device 1200 may be a wireless interactive wand or a smart wand configured to communicate wirelessly via radio frequency (RF) or infrared (IR) communication mode with other devices by utilizing power generated by a corresponding power storage unit. In accordance with another embodiment, the exemplary GR device 1200 may be an interactive wand configured to illuminate at a plurality of sections by utilizing power generated by the corresponding power storage unit. In accordance with another embodiment, the exemplary GR device 1200 may be an interactive wand that may include exemplary circuits, such as piezoelectric actuators or linear resonant actuators, configured to generate haptic feedback by utilizing power generated by a power storage unit. For example, the exemplary GR device 1200 may light-up, vibrate and/or buzz at climactic movements while watching a movie or a show. In accordance with another embodiment, the exemplary GR device 1200 may communicate with an enchanted object, via an external electronic device, without use of a router. In certain embodiments, the external electronic device comprises a gesture recognition engine for classifying the gestures by type and associating the action identifiers and gesture types. In other embodiments, the exemplary GR device 1200 may comprise the gesture recognition engine that may be executed by the exemplary GR device 1200 or via connection to the cloud.

Figure 13:
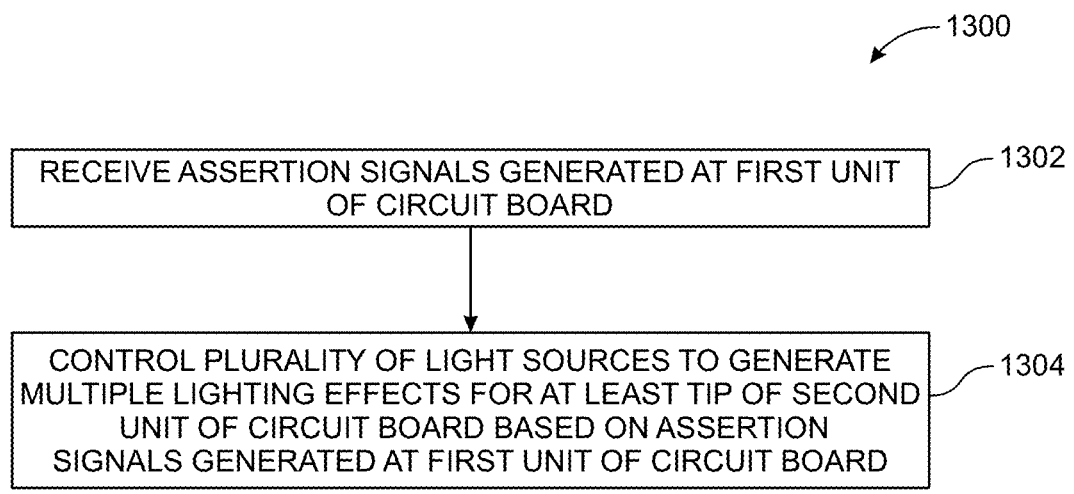
FIG. 13 is a flow chart illustrating an overall method for controlling a plurality of light sources to generate multiple lighting effects for at least the tip portion of the exemplary GR device, in accordance with various embodiments of the disclosure.

FIG. 13 is a flow chart 1300 that illustrates an overall method for controlling the plurality of light sources 1258 to generate multiple lighting effects for at least the tip portion of the exemplary GR device 1200, in accordance with various embodiments of the disclosure.

At 1302, assertion signals, generated at the first unit 1252 of the circuit board, i.e. the PCB 1250, may be received. In accordance with an embodiment, the processor or the microcontroller unit, such as the controller 106, may be configured to receive the assertion signals generated at the first unit 1252 of the circuit board, i.e. the PCB 1250. The assertion signals may be generated by one or more sensor controllers at the first unit 1252 in response to one or more assertions provided by the user 99. For example, the assertions may correspond to a touch input provided by hand of the user 99 or a gesture input provided by a specific pattern of movement of the exemplary GR device 1200 by the user 99.

In accordance with an embodiment, the one or more sensor controllers may be configured to convert a voltage received from one or more sensors, such as capacitive touch sensors (not shown) or the IMU 108, into raw digital data. The one or more sensor controllers may analyze the raw digital data based on a pre-stored touch and/or gesture recognition algorithm to detect the touch input or a gesture input and generate corresponding assertion signals. Thus, the assertion signals may be generated by the one or more sensor controllers based on an assertion, such as touch input, a gripping technique, or a gesture input, provided by the user 99 at the first unit 1252 of the circuit board, i.e. the PCB 1250.

At 1304, the plurality of light sources 1258 may be controlled to generate multiple lighting effects for at least the tip of the second unit 1254 of the circuit board, i.e. the PCB 1250, based on the assertion signals generated at the first unit 1252 of the circuit board, i.e. the PCB 1250. In accordance with an embodiment, the controller 106 may be configured to control the plurality of light sources 1258 to generate multiple lighting effects for at least the tip of the second unit 1254 of the circuit board, i.e. the PCB 1250, based on the assertion signals generated at the first unit 1252 of the circuit board, i.e. the PCB 1250.

In accordance with an embodiment, the controller 106 may be configured to drive the first light source 1262 to generate a first lighting effect, such as a directional beam in IR spectrum. Similarly, the controller 106 may be configured to drive the set of second light sources, for example, the first pair of LEDs 1264 to the fifth pair of LEDs 1266, to generate a set of second lighting effects, such as illumination in the multiple colors in visible spectrum.

In accordance with an embodiment, the set of second lighting effects remains unblocked by the side-mounted first light source 1262. The first light source 1262 does not block the set of second lighting effects generated by the set of second light sources, for example, the first pair of LEDs 1264 to the fifth pair of LEDs 1266, as the first light source 1262 is side-mounted on the tip of the second unit 1254 and the set of second light sources are edge mounted on the top surface 1254A and the bottom surface 1254B of the second unit 1254. The width of the first light source 1262 is near to if not flush with the top surface 1254A and the bottom surface 1254B. Further, the thickness of the first light source 1262 is substantially same, if not flush, with the side edges (which are orthogonal to the top surface 1254A and the bottom surface 1254B) of the second unit 1254. Such an arrangement enables the first light source 1262 not to occlude the set of second lighting effects generated by the set of second light sources.

Further, the illumination by the set of second light sources in the multiple colors is independent of the directional beam generated by the first light source 1262 side-mounted at the tip of the second unit 1254. In other words, the controller 106 may be configured to control the first lighting effect generated by the first light source 1262 and the set of second lighting effects generated by the set of second light sources in such a manner that the two lighting effects remains independent of each other. For example, the user 99 holds the exemplary GR device 1200 based on a particular gripping technique, for example, the exemplary GR device 1200 resting orthogonally on the forefinger and the thumb providing a support from the opposite side. Such a gripping technique may assert the capacitive touch sensing pads arranged around the top of the handle 1204. Based on corresponding assertion signal generated by the capacitive touch sensor, the controller 106 may be configured to activate the set of second light sources. The set of second light sources, when activated, may be configured to generate the set of second lighting effects. An example of such light effect may be an animated effect that corresponds to illumination of the set of second light sources, i.e. the RGB LEDs, in multi-colours, hues, and/or with varying intensity at the same time.

In another example, the use 99 may be holding the exemplary GR device 1200 based on the gripping technique, as described above, and further provides a gesture input in a specific pattern of movement of the exemplary GR device 1200. In such a case, the one or more sensors, such as the capacitive touch sensing pads and the IMU 108, are asserted and an assertion signal is generated by corresponding one or more sensor controllers. Based on corresponding assertion signal, the controller 106 may be configured to activate the first light source 1262 and the set of second light sources. The first light source 1262 and the set of second light sources, when activated, may be configured to generate the first light effect and the set of second lighting effects, respectively. The two lighting effects remain independent of each other as the first light source 1262 never occludes the set of second lighting effects due to corresponding mountings on the second unit 1254.

In certain embodiments, the plurality of light sources 1258 may be controlled by the controller 106 to generate the multiple lighting effects during same time duration. In other embodiments, the plurality of light sources 1258 may be controlled by the controller 106 to generate the multiple lighting effects during different time durations.

Figure 14:
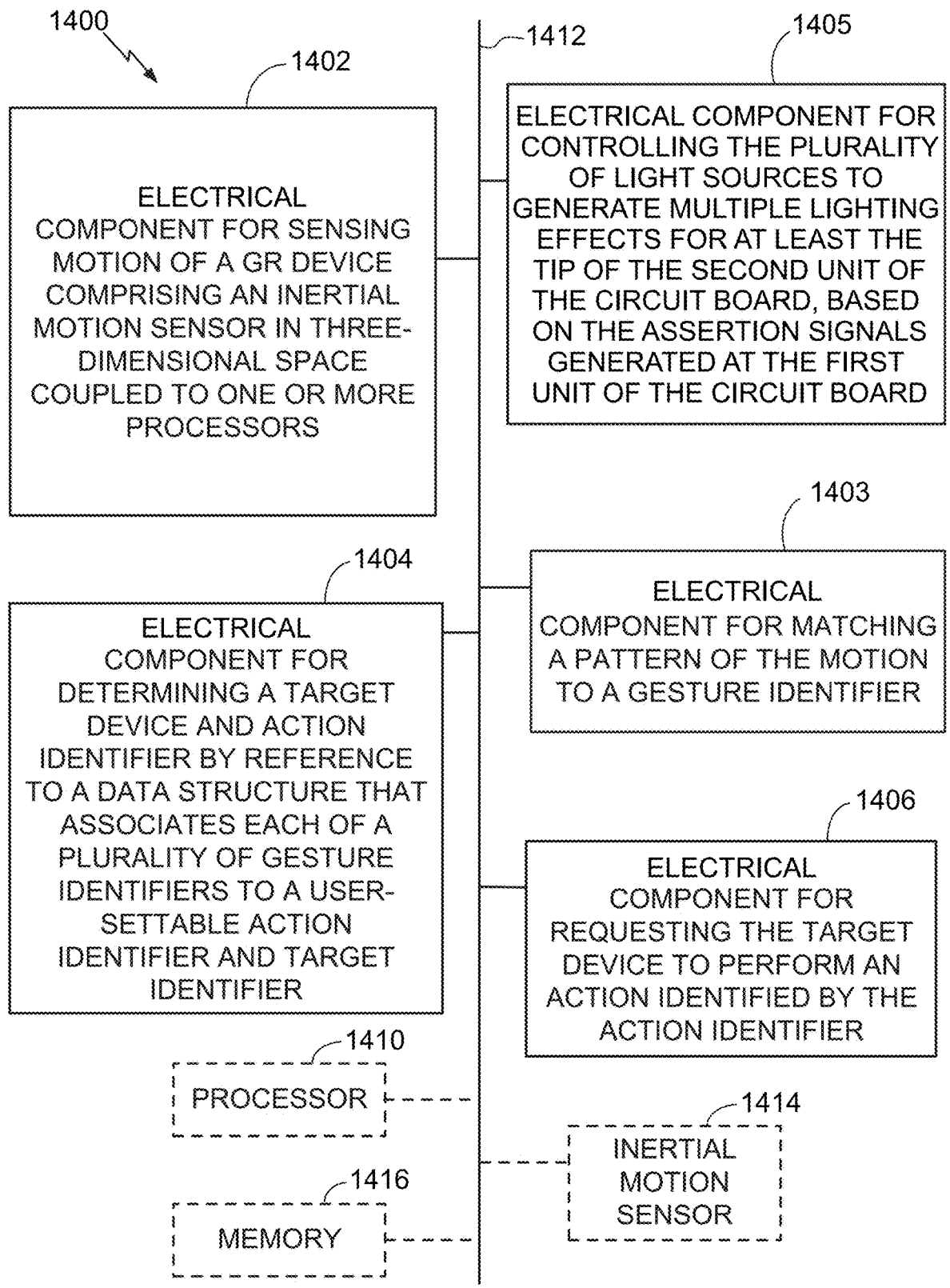
FIG. 14 is a conceptual block diagram illustrating components of an apparatus or system for providing a gesture-centric user interface for controlling one or more connected devices.

FIG. 14 shows components of an apparatus or system 1400 for providing a gesture-centric user interface for multiple target devices and controlling the plurality of light sources 1258 to generate multiple lighting effects for at least the tip of the second unit 1254 of the circuit board, i.e., the PCB 1250, based on assertion signals generated at the first unit 1252 of the circuit board, i.e., the PCB 1250, as described herein, according to method 1100 and the flowchart 1300, respectively. As depicted, the apparatus or system 1400 may include functional blocks that can represent functions implemented by a processor, software, or combination thereof (e.g., firmware).

The apparatus or system 1400 may comprise an electrical component 1402 for sensing motion of a GR device comprising an inertial motion sensor in three-dimensional space coupled to one or more processors. The component 1402 may be, or may include, a means for said sensing. Said means may include the processor 1410 coupled to the memory 1416, and to the inertial motion sensor 14, the processor executing an algorithm based on program instructions stored in the memory. Such algorithm may include a sequence of more detailed operations, for example, method 700 as described in connection with FIG. 7.

The apparatus or system 1400 may further comprise an electrical component 1403 for matching a pattern of the motion to a gesture identifier, e.g., recognizing the gesture. The component 1403 may be, or may include, a means for said matching or recognizing. Said means may include the processor 1410 coupled to the memory 1416, the processor executing an algorithm based on program instructions stored in the memory. Such algorithm may include a sequence of more detailed operations, for example, method 804 as described in connection with FIG. 8B.

The apparatus or system 1400 may further comprise an electrical component 1404 for determining a target device and action identifier by reference to a data structure that associates each of a plurality of gesture identifiers to a user-settable action identifier and target identifier. The component 1404 may be, or may include, a means for said matching. Said means may include the processor 1410 coupled to the memory 1416 containing a library data structure, the processor executing an algorithm based on program instructions stored in the memory. Such algorithm may include a sequence of more detailed operations, for example, the method 800 described in connection with FIG. 8A.

The apparatus or system 1400 may further comprise an electrical component 1405 for controlling the plurality of light sources 1258 to generate multiple lighting effects for at least the tip of the second unit 1254 of the circuit board, i.e. the PCB 1250, based on the assertion signals generated at the first unit 1252 of the circuit board, i.e. the PCB 1250. The electrical component 1405 may be, or may include, a means for said controlling. Said means may include the processor 1410 coupled to the memory 1416 containing a library data structure, the processor executing an algorithm based on program instructions stored in the memory. Such algorithm may include a sequence of more detailed operations, for example, the method according to the flowchart 1300 described in connection with FIG. 13.

The apparatus or system 1400 may further comprise an electrical component 1406 for requesting the target device to perform an action identified by the action identifier. The component 1406 may be, or may include, a means for said requesting. Said means may include the processor 1410 coupled to the memory 1416, and to a network interface device, the processor executing an algorithm based on program instructions stored in the memory. Such algorithm may include a sequence of more detailed operations, for example, the method 900 described in connection with FIG. 9.

The apparatus 1400 may optionally include a processor module 1410 having at least one processor, in the case of the apparatus 1400 configured as a data processor. The processor 1410, in such case, may be in operative communication with the modules 1402-1406 via a bus 1412 or other communication coupling, for example, a network. The processor 1410 may initiate and schedule the processes or functions performed by electrical components 1402-1406. The electrical components 1402-1406 may also be referred to as circuits or circuitry.

In related aspects, the apparatus 1400 may include a network interface module (not shown in FIG. 14, shown in FIG. 1) operable for communicating with a targeted clients and network resources over a computer network. In further related aspects, the apparatus 1400 may optionally include a module for storing information, such as, for example, a memory device/module 1416. The computer readable medium or the memory module 1416 may be operatively coupled to the other components of the apparatus 1400 via the bus 1412 or the like. The memory module 1416 may be adapted to store computer readable instructions and data for effecting the processes and behavior of the modules 1402-1406, and subcomponents thereof, or the processor 1410, or the any method or process described herein. The memory module 1416 may retain instructions for executing functions associated with the modules 1402-1406. While shown as being external to the memory 1416, it is to be understood that the modules 1402-1406 can exist within the memory 1416.

The proposed exemplary GR device 1200 provides various advantages. For example, the aesthetic look-and-feel of the exemplary GR device 1200 is greatly enhanced due to incorporation of side-mounted IR LED, in addition to the edge-mounted RGB LEDs at the tip of the second unit 1254. Such a design of the IR LED and RGB LEDs may result in a dual-tip capability for a rigid circuit board, i.e., the PCB 1250. Such a design is further advantageous as the set of second lighting effects generated by the RGB LEDs remains unblocked by the side-mounted first light source 1262, i.e. the IR LED. Further, the exemplary GR device 1200 does not require any flex cable, due to which the production cost is reduced, a substantial space on the circuit board is saved, and the exemplary GR device 1200 remains affordable. Furthermore, due to the retroreflective paint applied at the doughnut-shaped portion 1214 of the outer shell tip portion 1210, the exemplary GR device 1200 may still be seen by the target device 1216 even when the exemplary GR device 1200 is powered off, thus acting as a passive device capable of providing a gesture input, which may be sensed by the target device 1216. Thus, the exemplary GR device 1200 provides a natural handling experience and a dramatically magical ambience to the user 99.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the application and design constraints imposed on the overall system. Skilled artisans may implement the described functionality in varying ways for each application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer or system of cooperating computers. By way of illustration, both an application running on a server and the server can be a component. One or more components may reside within a process and/or thread of execution and a component may be localized on one computer and/or distributed between two or more computers.

Various aspects will be presented in terms of systems that may include several components, modules, and the like. It is to be understood and appreciated that the various systems may include additional components, modules, etc. and/or may not include all the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Operational aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Furthermore, the one or more versions may be implemented as a method, apparatus, or article of manufacture using standard programming and/or engineering techniques to produce software, firmware, hardware, or any combination thereof to control a computer to implement the disclosed aspects. Non-transitory computer readable media can include but are not limited to magnetic storage devices (e.g., hard disk, floppy disk, magnetic strips . . . ), optical disks (e.g., compact disk (CD), digital versatile disk (DVD), BluRay™ . . . ), smart cards, solid-state devices (SSDs), and flash memory devices (e.g., card, stick). Of course, those skilled in the art will recognize many modifications may be made to this configuration without departing from the scope of the disclosed aspects.

The previous description of the disclosed aspects is provided to enable any person skilled in the art to make or use the present disclosure. Various modifications to these aspects will be clear to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers.

What is claimed is:

1. A gesture recognition (GR) device, comprising:
a circuit board on which a plurality of light sources comprising a first light source and a set of second light sources are mounted,
wherein the first light source is side-mounted at a tip of a second unit,
wherein the set of second light sources is mounted at right angles at top and bottom surfaces of the second unit, and
wherein a first pair from the set of second light sources is positioned adjacent to the first light source;
a memory for storing instructions; and
one or more processors for executing the instructions to perform a method, the method comprising:
controlling the plurality of light sources to generate multiple lighting effects for at least the tip of the second unit of the circuit board based on assertion signals generated at a first unit of the circuit board, wherein a first lighting effect corresponds to a directional beam generated by the first light source,
wherein a set of second lighting effects correspond to a multi-color illumination generated by the set of second light sources, and
wherein the set of second lighting effects remains unblocked by the first light source.

2. The GR device according to claim 1, wherein the first unit corresponds to a base unit configured to be grasped by hand of a user, and
wherein the second unit corresponds to an elongate unit that extends outward from the first unit.

3. The GR device according to claim 1, wherein the first light source corresponds to an infrared (IR) light emitting diode (LED),
wherein the set of second light sources correspond to RGB LEDs,
wherein the directional beam of the first light source is in IR spectrum, and
wherein the multi-color illumination of the set of second light sources is in visible spectrum.

4. The GR device according to claim 1, wherein the plurality of light sources is controlled to generate the multiple lighting effects during same time duration.

5. The GR device according to claim 1, wherein the plurality of light sources is controlled to generate the multiple lighting effects during different time durations.

6. The GR device according to claim 1, wherein the multi-color illumination by the set of second light sources is independent of the directional beam generated by the first light source side-mounted at the tip of the second unit.

7. The GR device according to claim 1, wherein the circuit board is a rigid printed circuit board (PCB) with an aspect ratio that corresponds to at least a difference of 70 percent between length and width of the circuit board.

8. The GR device according to claim 1, wherein a first thickness of the first light source is substantially same as a second thickness of the circuit board.

9. The GR device according to claim 1, wherein the first light source is side-mounted at the tip of the second unit by edge-soldering using edge plating and/or castellations of the circuit board.

10. The GR device according to claim 9, wherein a width of the first light source is within the top and bottom surfaces of the second unit when the first light source is side-mounted at the tip of the second unit.

11. The GR device according to claim 1, wherein a portion of an outer shell of the GR device exhibits translucency and bloom radiance upon the multi-color illumination of a corresponding pair from the set of second light sources mounted on the second unit, and
wherein the corresponding pair from the set of second light sources is located on the second unit positioned underneath the portion of the outer shell of the GR device.

12. The GR device according to claim 11, wherein the portion of the outer shell of the GR device corresponds to at least an outer shell tip.

13. The GR device according to claim 11, wherein the portion of the outer shell is visually opaque before the multi-color illumination of the corresponding pair from the set of second light sources.

14. The GR device according to claim 11, wherein a bloom radiance exhibited by the portion of the outer shell is based on a plurality of attributes of the portion of the outer shell, and
wherein the plurality of attributes comprise at least a diffusing property of polymer blend of the portion of the outer shell, a transmissive property of the portion of the outer shell, a plurality of properties of coating applied on surface of the portion of the outer shell, a coating technique applied on the surface of the portion of the outer shell, and incorporation of a first pair of LEDs from the set of second light sources.

15. The GR device according to claim 1, wherein a directionality feature of the GR device is identified by a target device based on detection of the directional beam generated by the first light source, and
wherein a wide angle IR illumination is generated by the target device.

16. The GR device according to claim 15, wherein an outer shell tip of the GR device is coated with an infrared reflective paint that reflects the wide angle IR illumination back to the target device with minimum scattering.

17. The GR device according to claim 16, wherein the outer shell tip further comprises an optical mirror that reflects the wide angle IR illumination back to the target device with minimum scattering.

18. The GR device according to claim 1, wherein the method further comprising actively driving the first light source and the set of second light sources to generate the first lighting effect and the set of second lighting effects, respectively.

19. A circuit board, comprising:
a first unit that corresponds to a base unit configured to be grasped by hand of a user;
a second unit corresponds to an elongate unit that extends outward from the first unit;
a first light source side-mounted at a tip of the second unit, wherein the first light source is configured to generate a first lighting effect that corresponds to a directional beam;
a set of second light sources mounted at right angles at top and bottom surfaces of the second unit,
wherein the set of second light sources is configured to generate a set of second lighting effects that corresponds to a multi-color illumination,
wherein a first pair from the set of second light sources is positioned adjacent to the first light source, and
wherein the set of second lighting effects remains unblocked by the first light source; and
a controller configured to drive the first light source and the set of second light sources for generating multiple lighting effects for at least the tip of the second unit of the circuit board based on assertion signals provided at the first unit of the circuit board.

20. The circuit board according to claim 19, wherein the multiple lighting effects comprise the first lighting effect and the set of second lighting effects.

\* \* \* \* \*